US010962628B1

(12) United States Patent
Laifenfeld et al.

(10) Patent No.: US 10,962,628 B1
(45) Date of Patent: Mar. 30, 2021

(54) SPATIAL TEMPORAL WEIGHTING IN A SPAD DETECTOR

(71) Applicant: Apple Inc., Cupertino, CA (US)

(72) Inventors: Moshe Laifenfeld, Haifa (IL); Tal Kaitz, Kiryat Ono (IL); Shingo Mandai, Mountain View, CA (US); Cristiano L. Niclass, San Jose, CA (US)

(73) Assignee: Apple Inc., Cupertino, CA (US)

( * ) Notice: Subject to any disclaimer, the term of this patent is extended or adjusted under 35 U.S.C. 154(b) by 540 days.

(21) Appl. No.: 15/880,285

(22) Filed: Jan. 25, 2018

Related U.S. Application Data

(60) Provisional application No. 62/451,031, filed on Jan. 26, 2017.

(51) Int. Cl.
| | | |
|---|---|---|
| G01S 7/481 | (2006.01) | |
| G01S 7/486 | (2020.01) | |
| G01S 17/10 | (2020.01) | |
| G01S 7/4865 | (2020.01) | |
| G01S 7/4861 | (2020.01) | |

(52) U.S. Cl.
CPC .......... *G01S 7/4865* (2013.01); *G01S 7/4817* (2013.01); *G01S 7/4861* (2013.01); *G01S 17/10* (2013.01)

(58) Field of Classification Search
CPC ...... G01S 7/4865; G01S 17/10; G01S 7/4861; G01S 7/4817
USPC ........................................................ 356/5.03
See application file for complete search history.

(56) References Cited

U.S. PATENT DOCUMENTS

| | | | |
|---|---|---|---|
| 4,686,572 | A | 8/1987 | Takatsu |
| 4,686,648 | A | 8/1987 | Fossum |
| 5,105,264 | A | 4/1992 | Erhardt et al. |
| 5,329,313 | A | 7/1994 | Keith |
| 5,396,893 | A | 3/1995 | Oberg et al. |

(Continued)

FOREIGN PATENT DOCUMENTS

| | | |
|---|---|---|
| CN | 1630350 | 6/2005 |
| CN | 1774032 | 5/2006 |

(Continued)

OTHER PUBLICATIONS

U.S. Appl. No. 15/699,806, filed Sep. 8, 2017, Li et al.

(Continued)

*Primary Examiner* — Daniel L Murphy
(74) *Attorney, Agent, or Firm* — Brownstein Hyatt Farber Schreck, LLP

(57) ABSTRACT

Disclosed are devices and methods for scanning sensing systems having an array of light sensing pixels, such as pixels that use single-photon avalanche diodes. Light pulses are emitted into a field of view (FOV) at starts of a sequence of time intervals, and a weighted tabulation of the times-of-flight of the reflected light pulses within each time interval is used to detect an object in the FOV and determine its distance. Each weight is based on the time-of-flight between the emitted pulse and the received reflected light pulse and on the number of the emitted light pulse in the sequence of emitted light pulses. For near objects the weights emphasize times-of-flight from peripheral time intervals of the sequence; for far objects the weights emphasize central time intervals of the sequence.

22 Claims, 21 Drawing Sheets

(56) References Cited

U.S. PATENT DOCUMENTS

| | | |
|---|---|---|
| 5,471,515 A | 11/1995 | Fossum et al. |
| 5,541,402 A | 7/1996 | Ackland |
| 5,550,677 A | 8/1996 | Schofield et al. |
| 5,781,312 A | 7/1998 | Noda |
| 5,841,126 A | 11/1998 | Fossum et al. |
| 5,880,459 A | 3/1999 | Pryor et al. |
| 5,949,483 A | 9/1999 | Fossum et al. |
| 6,008,486 A | 12/1999 | Stam et al. |
| 6,040,568 A | 3/2000 | Caulfield et al. |
| 6,233,013 B1 | 5/2001 | Hosier et al. |
| 6,348,929 B1 | 2/2002 | Acharya et al. |
| 6,448,550 B1 | 9/2002 | Nishimura |
| 6,528,833 B2 | 3/2003 | Lee et al. |
| 6,541,751 B1 | 4/2003 | Bidermann |
| 6,670,904 B1 | 12/2003 | Yakovlev |
| 6,713,796 B1 | 3/2004 | Fox |
| 6,714,239 B2 | 3/2004 | Guidash |
| 6,798,453 B1 | 9/2004 | Kaifu |
| 6,816,676 B2 | 11/2004 | Bianchi et al. |
| 6,905,470 B2 | 6/2005 | Lee et al. |
| 6,931,269 B2 | 8/2005 | Terry |
| 6,956,605 B1 | 10/2005 | Hashimoto |
| 6,982,759 B2 | 1/2006 | Goto |
| 7,075,049 B2 | 7/2006 | Rhodes |
| 7,084,914 B2 | 8/2006 | Blerkom |
| 7,091,466 B2 | 8/2006 | Bock |
| 7,119,322 B2 | 10/2006 | Hong |
| 7,133,073 B1 | 11/2006 | Neter |
| 7,259,413 B2 | 8/2007 | Rhodes |
| 7,262,401 B2 | 8/2007 | Hopper et al. |
| 7,271,835 B2 | 9/2007 | Iizuka |
| 7,271,836 B2 | 9/2007 | Iizuka et al. |
| 7,282,028 B2 | 10/2007 | Kim et al. |
| 7,319,218 B2 | 1/2008 | Krymski |
| 7,332,786 B2 | 2/2008 | Altice et al. |
| 7,390,687 B2 | 6/2008 | Boettiger et al. |
| 7,415,096 B2 | 8/2008 | Sherman |
| 7,437,013 B2 | 10/2008 | Anderson |
| 7,443,421 B2 | 10/2008 | Stavely et al. |
| 7,446,812 B2 | 11/2008 | Ando et al. |
| 7,453,131 B2 | 11/2008 | Marshall et al. |
| 7,471,315 B2 | 12/2008 | Silsby et al. |
| 7,502,054 B2 | 3/2009 | Kalapathy et al. |
| 7,525,168 B2 | 4/2009 | Hsieh |
| 7,554,067 B2 | 6/2009 | Zarnowski et al. |
| 7,555,158 B2 | 6/2009 | Park et al. |
| 7,589,316 B2 | 9/2009 | Dunki-Jacobs |
| 7,622,699 B2 | 11/2009 | Sakakibara |
| 7,626,626 B2 | 12/2009 | Panicacci |
| 7,636,109 B2 | 12/2009 | Nakajima et al. |
| 7,667,400 B1 | 2/2010 | Goushcha |
| 7,671,435 B2 | 3/2010 | Ahn |
| 7,696,483 B2 | 4/2010 | Tkaczyk et al. |
| 7,714,292 B2 | 5/2010 | Agarwal et al. |
| 7,728,351 B2 | 6/2010 | Shim |
| 7,733,402 B2 | 6/2010 | Egawa |
| 7,742,090 B2 | 6/2010 | Street et al. |
| 7,764,312 B2 | 7/2010 | Ono et al. |
| 7,773,138 B2 | 8/2010 | Lahav et al. |
| 7,786,543 B2 | 8/2010 | Hsieh |
| 7,796,171 B2 | 9/2010 | Gardner |
| 7,817,198 B2 | 10/2010 | Kang et al. |
| 7,838,956 B2 | 11/2010 | McCarten et al. |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 3/2011 | Arimoto et al. |
| 7,952,635 B2 | 5/2011 | Lauxtermann |
| 7,982,789 B2 | 7/2011 | Watanabe et al. |
| 8,026,966 B2 | 9/2011 | Altice |
| 8,032,206 B1 | 10/2011 | Farazi et al. |
| 8,089,036 B2 | 1/2012 | Manabe |
| 8,089,524 B2 | 1/2012 | Urisaka |
| 8,094,232 B2 | 1/2012 | Kusaka |
| 8,116,540 B2 | 2/2012 | Dean et al. |
| 8,140,143 B2 | 3/2012 | Picard et al. |
| 8,153,947 B2 | 4/2012 | Barbier et al. |
| 8,159,570 B2 | 4/2012 | Negishi |
| 8,159,588 B2 | 4/2012 | Boemler |
| 8,164,669 B2 | 4/2012 | Compton et al. |
| 8,174,595 B2 | 5/2012 | Honda et al. |
| 8,184,188 B2 | 5/2012 | Yaghmal |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson et al. |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,338,856 B2 | 12/2012 | Tai et al. |
| 8,340,407 B2 | 12/2012 | Kalman |
| 8,350,940 B2 | 1/2013 | Smith et al. |
| 8,355,117 B2 | 1/2013 | Niclass |
| 8,388,346 B2 | 3/2013 | Rantala et al. |
| 8,400,546 B2 | 3/2013 | Itano et al. |
| 8,456,540 B2 | 6/2013 | Egawa |
| 8,456,559 B2 | 6/2013 | Yamashita et al. |
| 8,508,637 B2 | 8/2013 | Han et al. |
| 8,514,308 B2 | 8/2013 | Itonaga et al. |
| 8,520,913 B2 | 8/2013 | Dean et al. |
| 8,546,737 B2 | 10/2013 | Tian et al. |
| 8,547,388 B2 | 10/2013 | Cheng |
| 8,575,531 B2 | 11/2013 | Hynecek et al. |
| 8,581,992 B2 | 11/2013 | Hamada |
| 8,594,170 B2 | 11/2013 | Mombers et al. |
| 8,619,163 B2 | 12/2013 | Ogura |
| 8,619,170 B2 | 12/2013 | Mabuchi |
| 8,629,484 B2 | 1/2014 | Ohri et al. |
| 8,634,002 B2 | 1/2014 | Kita |
| 8,637,875 B2 | 1/2014 | Finkelstein |
| 8,648,947 B2 | 2/2014 | Sato et al. |
| 8,653,434 B2 | 2/2014 | Johnson et al. |
| 8,723,975 B2 | 5/2014 | Solhusvik |
| 8,724,096 B2 | 5/2014 | Gosch et al. |
| 8,730,345 B2 | 5/2014 | Watanabe |
| 8,754,983 B2 | 6/2014 | Sutton |
| 8,755,854 B2 | 6/2014 | Addison et al. |
| 8,759,736 B2 | 6/2014 | Yoo |
| 8,760,413 B2 | 6/2014 | Peterson et al. |
| 8,767,104 B2 | 7/2014 | Makino et al. |
| 8,803,990 B2 | 8/2014 | Smith |
| 8,810,703 B2 | 8/2014 | Machida |
| 8,817,154 B2 | 8/2014 | Manabe et al. |
| 8,874,377 B1 | 10/2014 | Sickenberger |
| 8,879,686 B2 | 11/2014 | Okada |
| 8,902,330 B2 | 12/2014 | Theuwissen |
| 8,902,341 B2 | 12/2014 | Mabuchi |
| 8,908,073 B2 | 12/2014 | Minagawa et al. |
| 8,923,994 B2 | 12/2014 | Laikari et al. |
| 8,934,030 B2 | 1/2015 | Kim et al. |
| 8,936,552 B2 | 1/2015 | Kateraas et al. |
| 8,946,610 B2 | 2/2015 | Iwabuchi et al. |
| 8,982,237 B2 | 3/2015 | Chen |
| 9,006,641 B2 | 4/2015 | Drader |
| 9,017,748 B2 | 4/2015 | Spelman et al. |
| 9,041,837 B2 | 5/2015 | Li |
| 9,054,009 B2 | 6/2015 | Oike et al. |
| 9,058,081 B2 | 6/2015 | Baxter |
| 9,066,017 B2 | 6/2015 | Geiss |
| 9,066,660 B2 | 6/2015 | Watson et al. |
| 9,088,727 B2 | 7/2015 | Trumbo |
| 9,094,623 B2 | 7/2015 | Kawaguchi |
| 9,099,604 B2 | 8/2015 | Roy et al. |
| 9,100,597 B2 | 8/2015 | Hu |
| 9,106,859 B2 | 8/2015 | Kizuna et al. |
| 9,131,171 B2 | 9/2015 | Aoki |
| 9,151,829 B2 | 10/2015 | Campbell |
| 9,154,750 B2 | 10/2015 | Pang |
| 9,160,949 B2 | 10/2015 | Zhang et al. |
| 9,164,144 B2 | 10/2015 | Dolinsky |
| 9,176,241 B2 | 11/2015 | Frach |
| 9,178,100 B2 | 11/2015 | Webster et al. |

(56) References Cited

U.S. PATENT DOCUMENTS

| | | |
|---|---|---|
| 9,209,320 B1 | 12/2015 | Webster |
| 9,225,948 B2 | 12/2015 | Hasegawa |
| 9,232,150 B2 | 1/2016 | Kleekajai et al. |
| 9,232,161 B2 | 1/2016 | Suh |
| 9,235,267 B2 | 1/2016 | Burrough et al. |
| 9,270,906 B2 | 2/2016 | Peng et al. |
| 9,276,031 B2 | 3/2016 | Wan |
| 9,277,144 B2 | 3/2016 | Kleekajai et al. |
| 9,287,304 B2 | 3/2016 | Park et al. |
| 9,288,380 B2 | 3/2016 | Nomura |
| 9,288,404 B2 | 3/2016 | Papiashvili |
| 9,293,500 B2 | 3/2016 | Sharma et al. |
| 9,312,401 B2 | 4/2016 | Webster |
| 9,313,434 B2 | 4/2016 | Dutton et al. |
| 9,319,611 B2 | 4/2016 | Fan |
| 9,331,116 B2 | 5/2016 | Webster |
| 9,344,649 B2 | 5/2016 | Bock |
| 9,354,332 B2 | 5/2016 | Zwaans et al. |
| 9,380,245 B1 | 6/2016 | Guidash |
| 9,392,237 B2 | 7/2016 | Toyoda |
| 9,417,326 B2 | 8/2016 | Niclass et al. |
| 9,431,439 B2 | 8/2016 | Soga et al. |
| 9,438,258 B1 | 9/2016 | Yoo |
| 9,445,018 B2 | 9/2016 | Fettig et al. |
| 9,448,110 B2 | 9/2016 | Wong |
| 9,450,007 B1 | 9/2016 | Motta et al. |
| 9,451,887 B2 | 9/2016 | Watson et al. |
| 9,467,553 B2 | 10/2016 | Heo et al. |
| 9,473,706 B2 | 10/2016 | Malone et al. |
| 9,478,030 B1 | 10/2016 | Lecky |
| 9,479,688 B2 | 10/2016 | Ishii |
| 9,490,285 B2 | 11/2016 | Itonaga |
| 9,497,397 B1 | 11/2016 | Kleekajai et al. |
| 9,503,616 B2 | 11/2016 | Taniguchi et al. |
| 9,516,244 B2 | 12/2016 | Borowski |
| 9,538,106 B2 | 1/2017 | McMahon et al. |
| 9,549,099 B2 | 1/2017 | Fan |
| 9,560,339 B2 | 1/2017 | Borowski |
| 9,584,743 B1 | 2/2017 | Lin et al. |
| 9,596,420 B2 | 3/2017 | Fan et al. |
| 9,596,423 B1 | 3/2017 | Molgaard |
| 9,639,063 B2 | 5/2017 | Dutton et al. |
| 9,661,308 B1 | 5/2017 | Wang et al. |
| 9,685,576 B2 | 6/2017 | Webster |
| 9,686,485 B2 | 6/2017 | Agranov et al. |
| 9,700,240 B2 | 7/2017 | Letchner et al. |
| 9,741,754 B2 | 8/2017 | Li et al. |
| 9,749,556 B2 | 8/2017 | Fettig et al. |
| 9,774,318 B2 | 9/2017 | Song |
| 9,781,368 B2 | 10/2017 | Song |
| 9,831,283 B2 | 11/2017 | Shepard et al. |
| 9,857,469 B2 | 1/2018 | Oggier et al. |
| 9,870,053 B2 | 1/2018 | Modarres et al. |
| 9,888,198 B2 | 2/2018 | Mauritzson et al. |
| 9,894,304 B1 | 2/2018 | Smith |
| 9,912,883 B1 | 3/2018 | Agranov et al. |
| 9,915,733 B2 | 3/2018 | Fried |
| 9,935,231 B2 | 4/2018 | Roehrer |
| 9,939,316 B2 | 4/2018 | Scott et al. |
| 9,952,323 B2 | 4/2018 | Deane |
| 9,973,678 B2 | 5/2018 | Mandelli et al. |
| 9,985,163 B2 | 5/2018 | Moore |
| 10,026,772 B2 | 7/2018 | Shinohara |
| 10,067,224 B2 | 9/2018 | Moore |
| 10,120,446 B2 | 11/2018 | Pance et al. |
| 10,136,090 B2 | 11/2018 | Vogelsang et al. |
| 10,145,678 B2 | 12/2018 | Wang et al. |
| 10,153,310 B2 | 12/2018 | Zhang et al. |
| 10,217,889 B2 | 2/2019 | Dhulla et al. |
| 10,267,901 B2 | 4/2019 | Drader |
| 10,285,626 B1 | 5/2019 | Kestelli et al. |
| 10,305,247 B2 | 5/2019 | Bills et al. |
| 10,334,181 B2 | 6/2019 | Guenter |
| 10,338,221 B2 | 7/2019 | Lee et al. |
| 10,416,293 B2 | 9/2019 | Buckley |
| 10,495,736 B2 | 12/2019 | Zhuang |
| 10,651,332 B2 | 5/2020 | Moussy |
| 10,802,148 B2 | 10/2020 | Lee et al. |
| 2003/0036685 A1 | 2/2003 | Goodman et al. |
| 2004/0207836 A1 | 10/2004 | Chhibber et al. |
| 2005/0026332 A1 | 2/2005 | Fratti et al. |
| 2006/0274161 A1 | 12/2006 | Ing et al. |
| 2007/0263099 A1 | 11/2007 | Motta et al. |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0146234 A1 | 6/2009 | Luo et al. |
| 2009/0201400 A1 | 8/2009 | Zhang et al. |
| 2009/0219266 A1 | 9/2009 | Lim et al. |
| 2010/0110018 A1 | 5/2010 | Faubert et al. |
| 2010/0134631 A1 | 6/2010 | Voth |
| 2010/0159632 A1 | 6/2010 | Rhodes et al. |
| 2011/0080500 A1 | 4/2011 | Wang et al. |
| 2011/0156197 A1 | 6/2011 | Tivarus et al. |
| 2011/0164162 A1 | 7/2011 | Kato |
| 2012/0092541 A1 | 4/2012 | Tuulos et al. |
| 2012/0162632 A1 | 6/2012 | Dutton |
| 2013/0147981 A1 | 6/2013 | Wu |
| 2014/0049683 A1 | 2/2014 | Guenter et al. |
| 2014/0071321 A1 | 3/2014 | Seyama |
| 2014/0132528 A1 | 5/2014 | Catton |
| 2014/0231630 A1 | 8/2014 | Rae et al. |
| 2015/0062391 A1 | 3/2015 | Murata |
| 2015/0277559 A1 | 10/2015 | Vescovi et al. |
| 2015/0312479 A1 | 10/2015 | McMahon et al. |
| 2016/0050379 A1 | 2/2016 | Jiang et al. |
| 2016/0218236 A1 | 7/2016 | Dhulla et al. |
| 2016/0219232 A1 | 7/2016 | Murata |
| 2016/0274237 A1 | 9/2016 | Stutz |
| 2016/0365380 A1 | 12/2016 | Wan |
| 2017/0047363 A1 | 2/2017 | Choi et al. |
| 2017/0052065 A1 | 2/2017 | Sharma et al. |
| 2017/0082746 A1 | 3/2017 | Kubota et al. |
| 2017/0084133 A1 | 3/2017 | Cardinali et al. |
| 2017/0142325 A1 | 5/2017 | Shimokawa et al. |
| 2017/0223292 A1 | 8/2017 | Ikeda et al. |
| 2017/0272675 A1 | 9/2017 | Kobayashi |
| 2017/0364736 A1 | 12/2017 | Ollila |
| 2017/0373106 A1 | 12/2017 | Li et al. |
| 2018/0090526 A1 | 3/2018 | Mandai et al. |
| 2018/0090536 A1 | 3/2018 | Mandai et al. |
| 2018/0109742 A1 | 4/2018 | Agranov et al. |
| 2018/0209846 A1 | 7/2018 | Mandai et al. |
| 2018/0213205 A1 | 7/2018 | Oh |
| 2019/0018119 A1* | 1/2019 | Laifenfeld .............. G01S 7/497 |
| 2019/0027674 A1 | 1/2019 | Zhang et al. |
| 2019/0198701 A1 | 6/2019 | Moussy |
| 2020/0278429 A1 | 9/2020 | Mandai et al. |
| 2020/0286946 A1 | 9/2020 | Mandai et al. |

FOREIGN PATENT DOCUMENTS

| | | |
|---|---|---|
| CN | 1833429 | 9/2006 |
| CN | 1842138 | 10/2006 |
| CN | 1947414 | 4/2007 |
| CN | 101189885 | 5/2008 |
| CN | 101221965 | 7/2008 |
| CN | 101233763 | 7/2008 |
| CN | 101379615 | 3/2009 |
| CN | 101472059 | 7/2009 |
| CN | 101567977 | 10/2009 |
| CN | 101622859 | 1/2010 |
| CN | 101739955 | 6/2010 |
| CN | 101754029 | 6/2010 |
| CN | 101803925 | 8/2010 |
| CN | 102036020 | 4/2011 |
| CN | 102067584 | 5/2011 |
| CN | 102208423 | 10/2011 |
| CN | 102451160 | 5/2012 |
| CN | 102668542 | 9/2012 |
| CN | 102820309 | 12/2012 |
| CN | 102821255 | 12/2012 |
| CN | 103024297 | 4/2013 |

(56) References Cited

FOREIGN PATENT DOCUMENTS

| | | |
|---|---|---|
| CN | 103051843 | 4/2013 |
| CN | 103299437 | 9/2013 |
| CN | 103329513 | 9/2013 |
| CN | 103546702 | 1/2014 |
| CN | 103779437 | 5/2014 |
| CN | 104103655 | 10/2014 |
| CN | 104779259 | 7/2015 |
| CN | 104810377 | 7/2015 |
| CN | 204761615 | 11/2015 |
| CN | 105185796 | 12/2015 |
| CN | 105489624 | 4/2016 |
| DE | 102010060527 | 4/2012 |
| EP | 1763228 | 3/2007 |
| EP | 2023611 | 2/2009 |
| EP | 2107610 | 10/2009 |
| EP | 2230690 | 9/2010 |
| EP | 2512126 | 10/2012 |
| EP | 2787531 | 10/2014 |
| JP | S61123287 | 6/1986 |
| JP | 2007504670 | 8/1987 |
| JP | 2000059697 | 2/2000 |
| JP | 2001211455 | 8/2001 |
| JP | 2001358994 | 12/2001 |
| JP | 2004111590 | 4/2004 |
| JP | 2004319576 | 11/2004 |
| JP | 2005318504 | 11/2005 |
| JP | 2006287361 | 10/2006 |
| JP | 2007516654 | 6/2007 |
| JP | 2008507908 | 3/2008 |
| JP | 2008271280 | 11/2008 |
| JP | 2008543061 | 11/2008 |
| JP | 2009021809 | 1/2009 |
| JP | 2009159186 | 7/2009 |
| JP | 2009212909 | 9/2009 |
| JP | 2009296465 | 12/2009 |
| JP | 2010080604 | 4/2010 |
| JP | 2010114834 | 5/2010 |
| JP | 2011040926 | 2/2011 |
| JP | 2011049697 | 3/2011 |
| JP | 2011091775 | 5/2011 |
| JP | 11-216970 | 10/2011 |
| JP | 11-217315 | 10/2011 |
| JP | 2011097646 | 12/2011 |
| JP | 2012010306 | 1/2012 |
| JP | 2012019516 | 1/2012 |
| JP | 2012038981 | 2/2012 |
| JP | 2012513160 | 6/2012 |
| JP | 2012169530 | 9/2012 |
| JP | 2013051523 | 3/2013 |
| JP | 2013070240 | 4/2013 |
| JP | 2013529035 | 7/2013 |
| JP | 2014081254 | 5/2014 |
| JP | 2014225647 | 12/2014 |
| JP | 2015041746 | 3/2015 |
| JP | 2016145776 | 8/2016 |
| KR | 20030034424 | 5/2003 |
| KR | 20030061157 | 7/2003 |
| KR | 20050103732 | 11/2005 |
| KR | 2008/0069851 | 7/2008 |
| KR | 20100008239 | 1/2010 |
| KR | 20100065084 | 6/2010 |
| KR | 20130074459 | 7/2013 |
| TW | 200520551 | 6/2005 |
| TW | 200803481 | 1/2008 |
| TW | 201110689 | 3/2011 |
| TW | 201301881 | 1/2013 |
| WO | WO 05/041304 | 5/2005 |
| WO | WO 06/014641 | 2/2006 |
| WO | WO 06/130443 | 12/2006 |
| WO | WO 07/049900 | 5/2007 |
| WO | WO 10/120945 | 10/2010 |
| WO | WO 12/011095 | 1/2012 |
| WO | WO 12/032353 | 3/2012 |
| WO | WO 12/053363 | 4/2012 |
| WO | WO 12/088338 | 6/2012 |
| WO | WO 12/122572 | 9/2012 |
| WO | WO 12/138687 | 10/2012 |
| WO | WO 13/008425 | 1/2013 |
| WO | WO 13/179018 | 12/2013 |
| WO | WO 13/179020 | 12/2013 |
| WO | WO 17/112416 | 6/2017 |
| WO | WO 20/045123 | 3/2020 |

OTHER PUBLICATIONS

U.S. Appl. No. 15/879,350, filed Jan. 24, 2018, Mandai et al.
U.S. Appl. No. 16/226,491, filed Dec. 19, 2018, McMahon.
Aoki, et al., "Rolling-Shutter Distortion-Free 3D Stacked Image Sensor with -160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.
Charbon, et al., SPAD-Based Sensors, *TOF Range-Imaging Cameras*, F. Remondino and D. Stoppa (eds.), 2013, Springer-Verlag Berlin Heidelberg, pp. 11-38.
Cox, "Getting histograms with varying bin widths," http://www.stata.com/support/faqs/graphics/histograms-with-varying-bin-widths/, Nov. 13, 2017, 5 pages.
Elgendi, "On the Analysis of Fingertip Photoplethysmogram Signals," *Current Cardiology Reviews*, 2012, vol. 8, pp. 14-25.
Feng, et al., "On the Stoney Formula for a Thin Film/Substrate System with Nonuniform Substrate Thickness," *Journal of Applied Mechanics*, Transactions of the ASME, vol. 74, Nov. 2007, pp. 1276-1281.
Fu, et al., "Heart Rate Extraction from Photoplethysmogram Waveform Using Wavelet Multui-resolution Analysis," *Journal of Medical and Biological Engineering*, 2008, vol. 28, No. 4, pp. 229-232.
Gallivanoni, et al., "Progress n Quenching Circuits for Single Photon Avalanche Diodes," *IEEE Transactions on Nuclear Science*, vol. 57, No. 6, Dec. 2010, pp. 3815-3826.
Han, et al., "Artifacts in wearable photoplethysmographs during daily life motions and their reduction with least mean square based active noise cancellation method," *Computers in Biology and Medicine*, 2012, vol. 42, pp. 387-393.
Jahromi et al., "A Single Chip Laser Radar Receiver with a 9×9 SPAD Detector Array and a 10-channel TDC," 2013 Proceedings of the ESSCIRC, IEEE, Sep. 14, 2015, pp. 364-367.
Leslar, et al., "Comprehensive Utilization of Temporal and Spatial Domain Outlier Detection Methods for Mobile Terrestrial LiDAR Data," *Remote Sensing*, 2011, vol. 3, pp. 1724-1742.
Lopez-Silva, et al., "Heuristic Algorithm for Photoplethysmographic Heart Rate Tracking During Maximal Exercise Test," *Journal of Medical and Biological Engineering*, 2011, vol. 12, No. 3, pp. 181-188.
Mota, et al., "A flexible multi-channel high-resolution Time-to-Digital Converter ASIC," *Nuclear Science Symposium Conference Record IEEE*, 2000, Engineering School of Geneva, Microelectronics Lab, Geneva, Switzerland, 8 pages.
Niclass, et al., "Design and Characterization of a CMOS 3-D Image Sensor Based on Single Photon Avalanche Diodes," *IEEE Journal of Solid-State Circuits*, vol. 40, No. 9, Sep. 2005, pp. 1847-1854.
Santos, et al., "Accelerometer-assisted PPG Measurement During Physical Exercise Using the LAVIMO Sensor System," *Acta Polytechnica*, 2012, vol. 52, No. 5, pp. 80-85.
Sarkar, et al., "Fingertip Pulse Wave (PPG signal) Analysis and Heart Rate Detection," *International Journal of Emerging Technology and Advanced Engineering*, 2012, vol. 2, No. 9, pp. 404-407.
Schwarzer, et al., On the determination of film stress from substrate bending: STONEY'S formula and its limits, Jan. 2006, 19 pages.
Shen et al., "Stresses, Curvatures, and Shape Changes Arising from Patterned Lines on Silicon Wafers," Journal of Applied Physics, vol. 80, No. 3, Aug. 1996, pp. 1388-1398.
Shin, et al., "Photon-Efficient Computational 3D and Reflectivity Imaging with Single-Photon Detectors," IEEE International Conference on Image Processing, Paris, France, Oct. 2014, 11 pages.
Tisa, et al., "Variable-Load Quenching Circuit for single-photon avalanche diodes," Optics Express, vol. 16, No. 3, Feb. 4, 2008, pp. 2232-2244.

(56) References Cited

OTHER PUBLICATIONS

Ullrich, et al., "Linear LIDAR versus Geiger-mode LIDAR: Impact on data properties and data quality," *Laser Radar Technology and Applications XXI*, edited by Monte D. Turner, Gary W. Kamerman, Proc. of SPIE, vol. 9832, 983204, 2016, 17 pages.

Yan, et al., "Reduction of motion artifact in pulse oximetry by smoothed pseudo Wigner-Ville distribution," *Journal of NeuroEngineering and Rehabilitation*, 2005, vol. 2, No. 3, pp. 1-9.

Yousefi, et al., "Adaptive Cancellation of Motion Artifact in Wearable Biosensors," 34th Annual International Conference of the IEEE EMBS, San Diego, California, Aug./Sep. 2012, pp. 2004-2008.

U.S. Appl. No. 16/688,932, filed Nov. 19, 2019, Niclass et al.

U.S. Appl. No. 16/876,511, filed May 18, 2020, Mandai et al.

U.S. Appl. No. 16/877,121, filed May 18, 2020, Mandai et al.

\* cited by examiner

SPATIAL TEMPORAL WEIGHTING IN A SPAD DETECTOR

CROSS-REFERENCE TO RELATED APPLICATIONS

This application claims the benefit under 35 U.S.C. § 119(e) of U.S. Provisional Patent Application No. 62/451,031, filed on Jan. 26, 2017, and entitled "Spatial Temporal Weighing In An SPAD Detector," which is incorporated by reference as if fully disclosed herein.

FIELD

The described embodiments relate in general to light detectors, such as may be used, for example, as part of a scanning light sensor or a scanning depth sensor (SDS) system. In SDS systems, objects in a field of view (FOV) can be detected by emitting light into the FOV and receiving reflections of the emitted light, such as on a photodetector array of light sensing pixels. Particular embodiments described include light detectors in which the light sensing pixels include single-photon avalanche diodes (SPADs). Such light detectors are termed SPAD detectors, and the pixels that include a SPAD diode are termed SPAD pixels. More particularly, the present embodiments relate to various spatial temporal weighting schemes that can be used with SPAD detectors or other light detectors.

BACKGROUND

Scanning light sensors and scanning depth sensor (SDS) systems can be used as stand-alone electronic devices, or as components of other electronic devices, such as digital cameras and 3D imagers. An SDS typically operates by emitting light into a field of view (FOV) and detecting reflections of the emitted light. By measuring the time between emission of the light and reception of its reflection, a distance to an object can be calculated. In some SDSs the light is emitted in one or more narrow beams, such as by lasers. In line scan implementations, an emitted beam is swept or scanned across the FOV and the reflected light beam is received at respective specific locations on an array of light sensing pixels. As the emitted beam is scanned over the FOV, the location of the received reflected beam sweeps across the array. The light detector that detects the reflected light beams in an SDS may be a SPAD detector, in which the array of light sensing pixels uses SPADs for enhanced light detection capabilities.

SPAD detectors are utilized in a variety of applications, such as low-light detection applications, time-of-flight (TOF) applications, and time-correlated single-photon counting applications. A SPAD detector typically includes an array of light sensing pixels, with each pixel including a SPAD. Each SPAD is a photosensitive region that is configured to detect low levels of light (down to a single photon) and to signal the arrival times of the light. An individual SPAD includes a diode reverse biased into its avalanche region. When a photon impinging on a SPAD of a SPAD pixel is part of a reflection from an object of an emitted light pulse, the output signal can be used to estimate the arrival time of the photon at the SPAD after emission of the light pulse. Multiple such arrival times can be used to estimate a distance to the object with greater certainty.

A SPAD typically has a constant sensitivity to photons, regardless of the distance between the SPAD and an object from which a photon has been reflected. In situations in which the object is close to the SPAD detector, the photons in the light reflected from that object impinge on the SPADs of the SPAD detector sooner and often in higher numbers than in situations in which the object is farther from the SPAD detector. Additionally, the photons in light reflected from an object having a higher reflectivity may impinge on the SPADs in higher numbers than photons in light reflected from an object having a lower reflectivity. When one or more photons impinge on a SPAD, the photons may trigger an avalanche event. A triggered SPAD (i.e., a SPAD in which an avalanche event has been triggered) will produce an output pulse signal corresponding to the SPAD's trigger time. Following an avalanche event or trigger, a SPAD will be saturated and have a recharging "dead time" during which the SPAD cannot be used to detect photons. Emitted photons reflected from a closer or more reflective object can saturate a SPAD at an early time and cause the SPAD to be unusable for detecting photons reflected from objects within a desired detection range. This can result in incorrect or unavailable estimates of the distance to an object within an intended detection range.

A TOF is a measurement of the amount of time that elapses between an emitter emitting a light pulse toward an object and the SPAD detector detecting photons in a light pulse that reflects off the object. In general, the light that reflects off an object that is close to the SPAD detector has a shorter TOF. The photons in the reflected light can impinge on the SPAD detector more quickly and in higher numbers than when an object is farther from the SPAD detector. The photons in the light reflected from the closer or more reflective object can saturate the SPADs more quickly, which can result in an incorrect estimate of the TOF.

Conversely, the light that reflects off an object that is farther from the SPAD detector has a longer TOF, and a lower intensity reflected light pulse. During the longer TOF, the amount of ambient light that is measured by the SPAD detector can overwhelm the reflected light pulse that was originally emitted by the emitter. It can be challenging to discern the reflected light pulse from the measured ambient light, which can make it difficult to correctly estimate the TOF.

Methods and devices are presented that, in some embodiments, address the problem of saturating SPADs and/or of poor signal to noise ratio (SNR).

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In a first embodiment, a method of estimating a distance of an object from a sensor includes emitting a sequence of light pulses, with one emitted light pulse emitted in an initial segment of a sequence of pulse repetition intervals (PRIs). The method includes receiving, during each of a plurality of the PRIs, a received light pulse at a light sensing pixel of the sensor, and determining a time-of-flight of each received light pulse. Each time-of-flight is determined from a discrete subinterval of time of the PRI during which the received light pulse was received. For each time-of-flight, a respective weight is determined based on the time-of-flight and the position within the sequence of PRIs of the PRI during which the received light pulse corresponding to the time-of-flight was received. The determined weight is used to form a weighted count of the times-of-flight. A distance to the object is estimated based on the weighted count of times-of-flight.

In additional and/or alternative embodiments, the method includes receiving a determination that the object is located at a far distance in a field of view, and consequently using weights for the times-of-flight of the received light pulses that are larger for received light pulses having higher signal to noise ratio than for received light pulses with lower signal to noise ratio. Such light pulses having higher signal to noise ratio may be received during a middle section of the sequence of PRIs. A spatial matched filter may be used to form the weighted count of the times-of-flight.

In additional and/or alternative embodiments, the method includes receiving a determination that the object is located at a near distance in a field of view, and consequently using weights for the times-of-flight of the received light pulses that are larger for received light pulses having reduced intensity than for received light pulses without reduced intensity. Such light pulses may be received during a peripheral section of the sequence of PRIs.

In a second embodiment, a method of operating a light sensor includes emitting a sequence of outgoing light pulses over a sequence of time intervals, with one outgoing light pulse being emitted during an initial segment of each time interval of the sequence of time intervals. The method includes receiving a first set of received light pulses during an initial section of the sequence of time intervals, and detecting whether the object is present at a near distance within a field of view of the sensor. The detection is based on an aggregation of times-of-flight of received light pulses in the first set. In the first case that an object is not detected in the near distance, the method includes receiving a second set of received light pulses during time intervals that follow the initial section of the sequence of time intervals. In this first case the method includes forming a first weighted count of times-of-flight of the received light pulses in the second set of received light pulses using a first set of weights, and determining a distance to the object based on the first weighted count. In the second case that an object is detected in the near distance, the method includes receiving a third set of received light pulses during the time intervals that follow the initial section of the sequence of time intervals. In this second case the method includes forming a second weighted count of times-of-flight of the third set of received light pulses and determining a distance to the object using the second weighted count. The weights of the first weights are larger for received light pulses with higher signal to noise ratio. The weights of the second set of weights are larger for received light pulses with reduced intensity.

In further embodiments, the weights of the first set of weights are larger for times-of-flight of received light pulses that were received in a middle section of the sequence of time intervals than for times-of-flight of received light pulses that are received in peripheral sections of the sequence of time intervals. The weights of the second set of weights are larger for times-of-flight of received light pulses that are received in a peripheral section of the sequence of time intervals than for times-of-flight of received light pulses that are received in a middle section of the sequence of time intervals.

In further embodiments, the light sensor includes a photodetector array including single-photon avalanche diode pixels.

In a third family of embodiments, an electronic device is disclosed that includes a scanning light sensor system that includes an emitter, a detector that includes an array of light sensing pixels, and a processing device. The processing device is linked to the emitter and the detector, and is configured to cause the emitter to emit an emitted light pulse during an initial segment of each pulse repetition interval (PRI) of a sequence of PRIs. The detector is configured to receive, during each of a plurality of PRIs of the sequence of PRIs, a received light pulse and to determine a time-of-flight for that light pulse. The time-of-flight is determined from a discrete subinterval of time of the PRI in which the received light pulse was received. The processing device is also configured to determine a weight for each time-of-flight, each weight determined using at least a position within the sequence of PRIs of the PRI during which the received light pulse was received. The weights are used to form a weighted count of the times-of-flight using the weights. The weighted count is used to estimate a distance to an object based on the weighted count of the times-of-flight.

In further embodiments, the weights are determined using the time-of-flight and the position within the sequence of the PRIs with a look-up table (LUT) having a first axis representing the position within the sequence of PRIs, and a second axis corresponding to the discrete subintervals of time.

BRIEF DESCRIPTION OF THE DRAWINGS

The disclosure will be readily understood by the following detailed description in conjunction with the accompanying drawings, wherein like reference numerals designate like structural elements.

Figure 1:
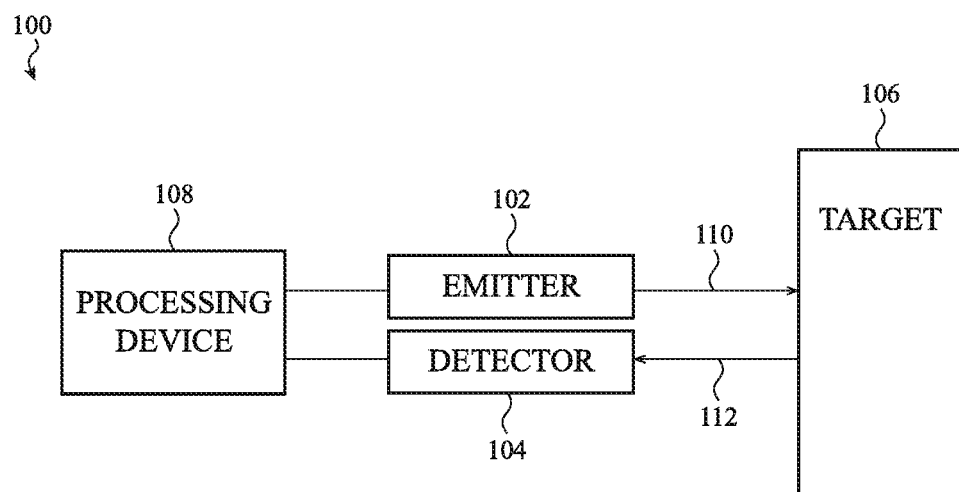
FIG. 1 shows one example of a scanning depth sensor system that can include one or more SPAD detectors.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to scanning light sensors and scanning depth sensor (SDS) systems (such as light detection and ranging (LIDAR) sensor systems). Such systems and sensors may use SPAD detectors (i.e., light detectors that use single-photon avalanche diodes (SPADs)). Such scanning light sensors and SDS systems operate by emitting light into a field of view (FOV) and observing reflections of the emitted light to detect whether there is an object in a field of view. In some embodiments, SDS systems use a line scan system in which the field of view (FOV) is swept with a beam of light pulses. Based on the time between emission of the light and the corresponding observed reflections on a light detector it is possible to estimate a distance to the object. Such systems and sensors may have as their light detector a photodetector array of light sensing pixels.

Embodiments may have a single-photon avalanche diode (SPAD) detector as its light detector. The SPAD detector includes an array of light sensing SPAD pixels (hereinafter, just "pixels"), wherein each such pixel includes a SPAD. Each pixel may also include associated biasing and/or control circuit elements, such as one or more of a quenching transistor and/or a gating transistor operably connected to the SPAD. Further circuit elements are described below for various embodiments. Times of flight (TOF) between the emitted pulses and received reflections of the emitted light pulses are used to calculate a distance to the object. Various spatial temporal weighting schemes that can be used with the SPAD detectors, and with other light detectors, are disclosed. Various techniques result in a histogram having bins that have each been incremented by differently weighted counts of detected photons.

Embodiments are discussed below with reference to FIGS. 1-17. However, those skilled in the art will readily appreciate that the detailed description given herein with respect to these Figures is for explanatory purposes only and should not be construed as limiting.

FIG. 1 illustrates a block diagram of a scanning depth sensor (SDS) system, such as a LIDAR or other system, that can include one or more light detectors, such as SPAD detectors. The system 100 includes an emitter 102, a detector 104, and a processing device 108. The emitter 102 and the detector 104 each represent one or more emitters and detectors, respectively. The emitter 102 is positioned to emit light into a field of view that includes the target or object 106. The detector 104 is situated to detect light from the field of view and/or reflected from the object 106.

A processing device 108 is operably connected to the emitter 102 and to the detector 104. The processing device 108 causes the emitter 102 to emit light towards the object 106 (emitted light represented by arrow 110). The light reflected from the object 106 and/or the scene may be detected by the detector 104 (reflected light represented by arrow 112). The processing device 108 receives the output signals from the detector 104 or receives conditioned output signals from intervening signal processing components (not shown). The processing device 108 processes the output signals to determine one or more characteristics associated with the reflected light, the object 106, and/or the scene. The particular components and operations discussed for system 100 are exemplary; in other embodiments the operations discussed may be distributed among the components differently.

The system 100 may be used as part of an electronic device, such as a camera, in a mobile phone, that scans a field of view (FOV). In general, in scanning systems, light is emitted into the FOV and information about objects or targets in the FOV is determined from reflections of the emitted light. Scanning systems may emit light in multiple directions from multiple emitters, or by sweeping a light (such as from a laser) in one or more directions across some or all of the FOV. A scanning system may use multiple sweeping light emitters, which may sweep the FOV in different directions or patterns.

Alternatively, the system 100 may be part of an electronic device in which the illumination of the FOV is not scanned but rather is illuminated in fixed directions, such as by one or multiple emitters. In such systems (e.g., fixed pattern systems), one or multiple light pulses may be emitted (e.g., multiple contemporaneously-emitted pulses), and each emission may be directed or disbursed in one or more directions. For example, in a facial recognition system, multiple directions may be selected for a first set of simultaneous emissions. The various reflected pulses may then be used to detect the distinguishing facial features of a user. For a second set of emissions, the directions may be reselected and varied. In some of the embodiments disclosed herein, the reflected pulses may be directed (such as by a lens) to traverse the light sensing pixels (e.g., SPAD pixels) in the light detector.

Figure 2:
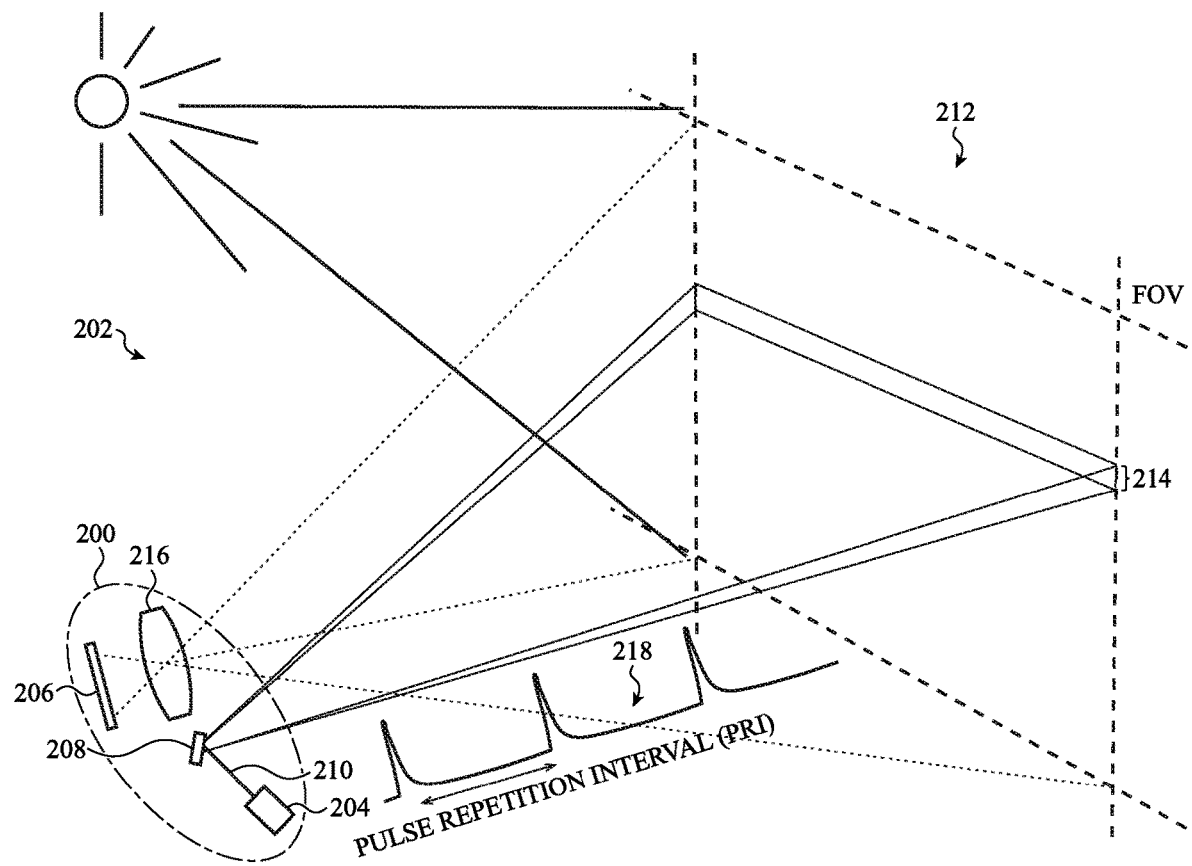
FIG. 2 depicts one example of a scanning depth sensor using a line scan system.

In some embodiments, a SPAD detector is used in a line scan system. FIG. 2 depicts an example of a line scan system 200 that uses a SPAD detector positioned in an environment 202. While this description will hereafter discuss the embodiments as used with the line scan system 200, one of skill in the art will recognize how the embodiments can be used with other scanning systems, such as a fixed pattern system. The line scan system 200 includes an emitter 204 and a SPAD detector 206, though other embodiments may use other detector technologies. The emitter 204 repeatedly emits light pulses 218, each within a respective time interval, over a period of time. The duration of each time interval, i.e., the time period between each emitted light pulse, is known as a pulse repetition interval (PRI). The PRI may be a fixed value, or may be varied and controlled, such as by processing device 108.

Collectively, the emitted light pulses 218 are referred to herein as an emitted light beam, or just a light beam 210. The light beam 210 may have an intended illumination area, volume, or emission pattern at any given moment in time. The light beam 210 is steered or directed towards the FOV 212 so that only a section 214 (e.g., a line) of the FOV 212 is illuminated at a time. The FOV 212 is scanned section-by-section during a FOV detection period. The FOV detection period is the time period needed to scan a selected part of the FOV.

The light that is returned to the device (e.g., via reflections off an object and/or the scene in the FOV 212) is received by a lens 216 that directs the light onto the SPAD detector 206. Since the light beam 210 is a series of light pulses, the reflected light is comprised of a series of light pulses. As will be described in more detail later, sections of the pixels in the SPAD detector 206 detect the reflected light pulses through a series of line scan operations. Each scan operation involves the emission of multiple light pulses and detection of reflected photons by selected pixels of the array. Each line scan operation scans or reads out the pixels in a section of the pixel array (e.g., two or three columns at a time). Reading out pixels can involve receiving the output signals produced by the pixels' SPADs, and possibly performing amplification or other conditioning of the output signals. When the line scan operation for one section of pixels is complete, another section of pixels is scanned. In one embodiment, the next section of pixels includes some of the pixels in the previous line scan operation. In another embodiment, the next section of pixels includes different pixels from the pixels in the previous line scan operation. This process repeats until all of the pixels within a chosen subset of pixels of the array have been scanned.

In one embodiment, a beam-steering element 208 (e.g., a mirror) is positioned in the optical path of the emitter 204 to steer the light beam 210 emitted by the emitter 204 towards the FOV 212. The beam-steering element 208 is configured to control the propagation angle and path of the light beam 210 so that only a section 214 of the FOV 212 is illuminated at a time.

The light beam 210 can be generated and/or steered differently in other embodiments. For example, the emitter 204 can include multiple emitters that each emits light toward a different section of the FOV 212.

An electronic timing control system (such as part of processing device 108) can deactivate some or all of the pixels in the array of light sensing pixels (hereinafter "pixel array" or just "array") during emission of each pulse of light to preclude the pixels from being saturated or giving a false signal. In some embodiments the electronic timing control system can then send a set of timing control signals to the emitter 204 to initiate or control emission of the sequence of light pulses. The electronic timing control system may subsequently send an activation signal to selected pixels in the array during times when no light is being emitted so that the activated pixels become configured to detect reflections of the emitted light pulses. The electronic timing control system can thus coordinate a particular activated pixel with a sequence of emitted or outgoing light pulses whose reflected pulses are expected to impinge on the activated pixel.

Figure 3:
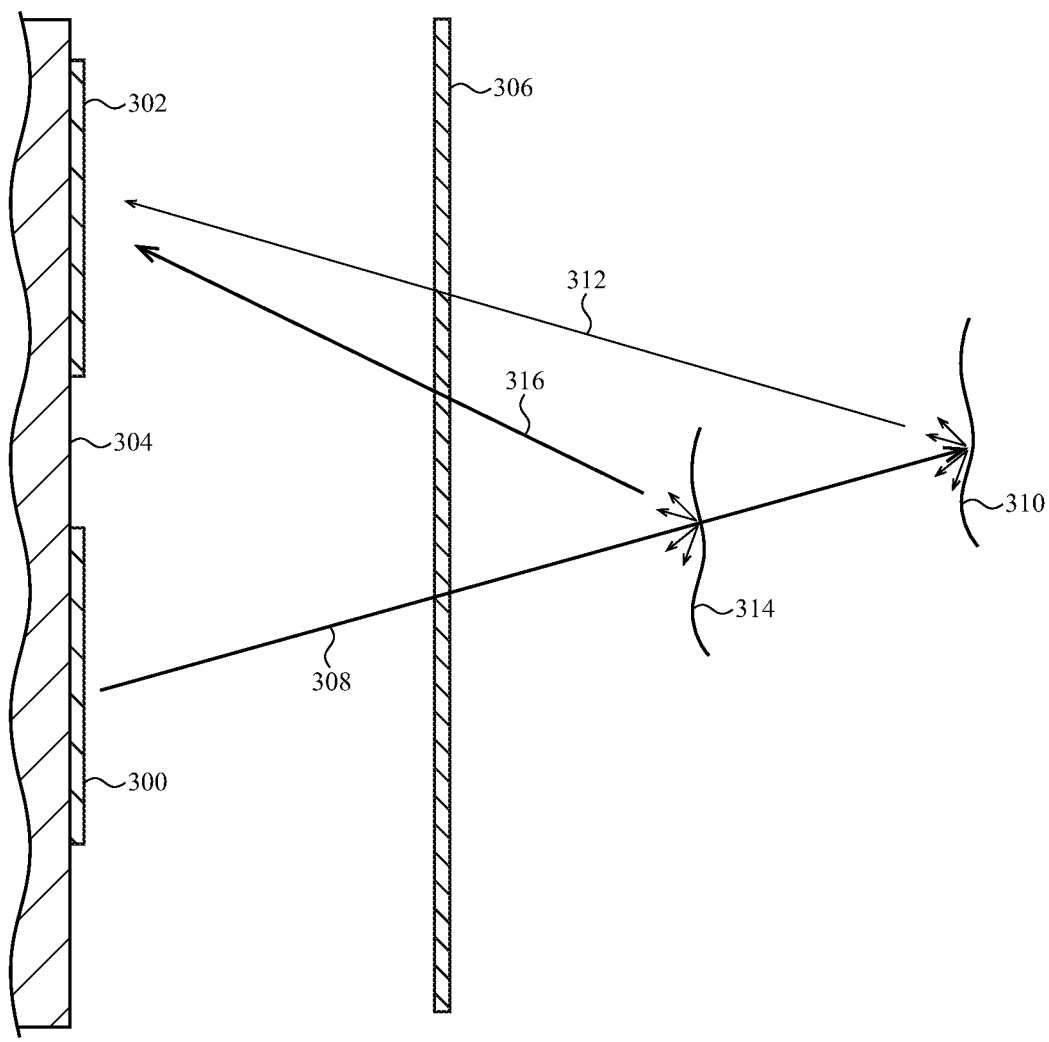
FIG. 3 shows an expanded cross section view of an emitter and SPAD detector in a scanning depth sensor.

FIG. 3 depicts an expanded view of an emitter and a SPAD detector in a scanning sensing system. In the illustrated embodiment, the emitter 300 and the SPAD detector 302 are disposed on a common substrate or support structure 304, although this is not required. The emitter 300 and the SPAD detector 302 may be positioned on separate substrates in other embodiments. A transparent or translucent cover layer 306 is typically positioned over the emitter 300 and the SPAD detector 302.

In an individual pixel of a SPAD detector, a SPAD is activated by being placed, such as by accompanying transistors, into a reversed biased state. In particular, a SPAD is operated in the avalanche region of reverse bias. When one or more photons enter the SPAD, charge carriers are created that migrate to an electrode. In so doing, they cause a cascade that increases the number of charge carriers leading to a measurable current spike. Surrounding circuitry, also called an analog front-end (AF), can amplify the current spike and transmit a signal indicating the reception of the photon(s). To save energy and prevent false positive reception signals, the SPAD can be deactivated (e.g., biased away from a reverse breakdown region) when its light detection operations are not expected or desired.

As mentioned previously, while the SPAD detector 302 may use a SPAD technology, the embodiments disclosed herein may use photodetector arrays based on other technologies, such as NMOS, PMOS, or CMOS photodetector arrays.

The emitter 300 may be a laser or other suitable light source that emits light 308 towards an object or FOV over a given period of time. In some embodiments, such as in a line scan system, the emitter 300 repeatedly emits a light pulse (e.g., light pulses 218 in FIG. 2) over a FOV detection period, i.e., a time interval allotted by the system for detecting objects in the FOV and determining their distances. The intensity waveform for the photons of an emitted light pulse generally has a substantially symmetric bell curve shape (e.g., a Gaussian shape), although this is not required. The intensity waveform of the light pulse may represent the amplitude of the electromagnetic energy as a function of time, or equivalently the number of photons per time. When the object 310 or 314 is in the field of view, the emitted light pulses are reflected and can be received by the SPAD detector 302. Under ideal reflection and reception conditions, the SPAD detector 302 would detect photons of a reflected light pulse for each emitted light pulse. A TOF between emission of a light pulse and reception of the reflected light pulse can be used to determine the distances (or ranges) to objects 310 and 314, using distance=TOF*c/2, where c is the speed of light. In practical systems, the distances to objects 310 and 314 from the emitter are much larger than the separation between the emitter 300 and the SPAD detector 302, so the separation between the emitter 300 and the SPAD detector 302 is negligible for this calculation.

Various factors interfere with the ideal detection and distance measuring scheme just described. One problem is that ambient light in the FOV may be received and erroneously treated as a reflection of an emitted light pulse. Some sensor systems may be configured so that the emitter sends outgoing light pulses having a narrow frequency band, and the cover layer 306 configured to filter all light except in that narrow frequency band. Even so, there still may be received ambient light photons that produce output signals. Some embodiments deal with this problem by receiving multiple reflected light pulses over a large number of emitted light pulses and detecting a spike at a calculated distance value above a background level of calculated distances produced by ambient light signals.

Further, not all emitted or outgoing light pulses may result in a reflected pulse that is detected or detectable, such as due to absorption at the object or in the intervening air, slight misdirection of the reflected light, errors in the electronics, or other factors. As described further below, even when a reflected light pulse is detected, a first reception problem is that the number of reflected light pulses detected from an object far from the emitter may be on the order of the number of output signals produced by photons from ambient light. Thus there could be no statistically detectable spike in the TOFs above those produced by the ambient light. A second reception problem is that, for an object near the emitter, the received reflected light pulses may saturate the SPADs of the pixels early in the durations of the light pulses and induce a bias in the peak of the calculated TOF. This second reception problem will be explained further below in relation to FIG. 4B.

Figure 4A:
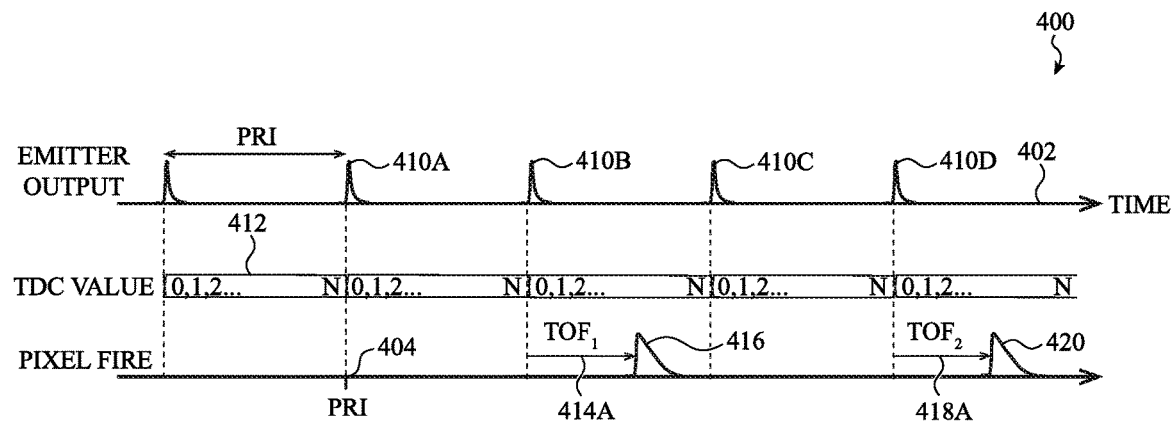
FIG. 4A shows a graph of emitted light pulses and a corresponding histogram of received reflected pulses in a scanning depth sensor.
Figure 4A:
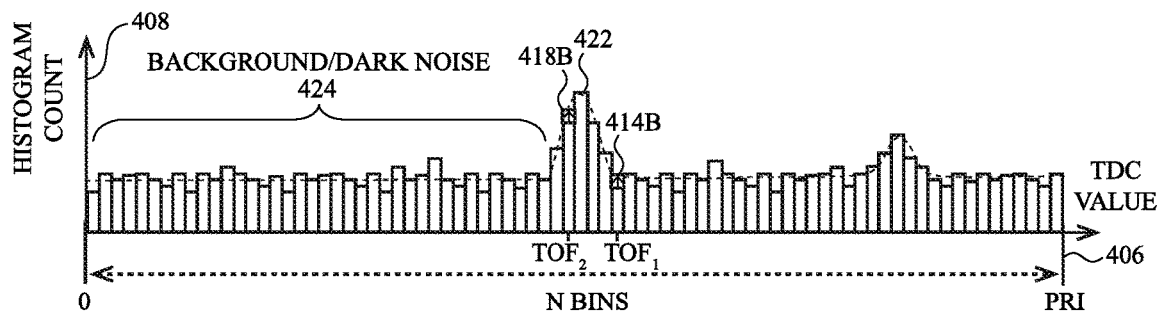

FIG. 4A illustrates how a sequence of emitted light pulses can be used by a scanning depth sensor to detect and determine a distance to an object in a FOV. In the situation shown, the emitter is presumed to be emitting light in a single direction, with the reflected light pulses being received at a single pixel of the array. For the line scan system discussed in relation to FIG. 2, the scan speed across the section 214 may be slow enough, and the PRI fast enough, that the single pixel would, under the ideal case, receive a large number of reflected pulses. In some embodiments, the number of emitted pulses that could be expected to be reflected and received at a single pixel can be on the order of 6000. Other embodiments may be such that the number is larger or smaller.

The top line of the top graph of FIG. 4A shows an emitter's outgoing beam comprising light pulses 410A-410D along a time axis 402. The light pulses are separated in time by a time interval termed a pulse repetition interval (PRI) 404. Within each PRI 404 the emitted light pulse typically occurs for a small initial segment of the PRI 404. In some embodiments the PRIs 404 have values on the order of 30 ns to 40 ns, and the initial segment is on the order of 2 ns, though this is not required. For an object in the FOV at a distance of 1 meter, the TOF will be approximately 6 ns. The PRI 404 for a particular application can be selected so that the TOF to and from an object at a maximum desired detection distance will be within the PRI 404 to allow for correlation of each emitted light pulse with each received reflected light pulse.

The second line of the top graph of FIG. 4A shows that within each PRI 404 a TOF is determined using a Time-to-Digital Converter (TDC). The TDC operates as a discrete time clock that cyclically counts a number of discrete subintervals of time 412 from the start of each PRI 404. The discrete subintervals of time 412 may be equal in duration so that each PRI 404 is divided into an equal number of discrete subintervals of time. In alternative embodiments, the durations of the discrete subintervals of time 412 may be different within each PRI, but having the same pattern of durations over all PRIs in the sequence.

The third line of the top graph in FIG. 4A shows the reflected light pulses detected at the single pixel (such as a SPAD pixel) as a function of time. In the example depicted, during the first and second PRIs, there is no detected reflected light pulse. This may occur due to absorption of the reflected light by the air or the cover layer 306, misdirection of the reflected light pulse, error in a SPAD pixel or its associated analog front end circuitry, or other reasons, as previously discussed.

During the third PRI, a reflected light pulse 416 is detected. In the case that the object is within a maximum detection distance, the reflected light pulse 416 is a reflection of the emitted light pulse 410B. The TOF 414A is obtained by the TDC, as explained below. During the fifth shown PRI, another reflected light pulse 420 is detected, which is a reflection of emitted pulse 410D and which has a respective TOF 418A.

The bottom plot in FIG. 4A shows a histogram giving the counts of reflected light pulses detected over multiple PRIs. The horizontal axis depicts that each single PRI 406 is subdivided into N successive memory locations, also called bins. The bins are in one-to-one correspondence to discrete subintervals of time within a single PRI that span all or part of the PRI. In the example shown, each bin represents a discrete subinterval of time (or just "discrete subinterval") having duration equal to PRI/N. Thus the TOF for a pulse detected in the $k^{th}$ discrete subinterval within a PRI 404 would equal k* PRI/N, within an error of at most PRI/N. For embodiments in which the discrete subintervals have different durations, the TOF could be determined from the total time of the discrete subintervals preceding the discrete subinterval in which the pulse is detected.

The vertical axis represents the counted number of reflected light pulses in each of the N bins of the histogram, each bin corresponding to a respective discrete subinterval of time of a PRI. The TDC can comprise a timer and circuitry to rapidly address N memory locations and increment the number in the memory location for efficient and fast counting of the received light pulses.

As will be clear to one of skill in the art, a histogram is a visual display of the counts of the TOF values, and as used hereinafter "histogram" will refer to any counting of the TOF values, such as in electronic memory locations, and need not be a visual display.

Over a large number of PRIs, a number of light pulses may be detected that do not arise as reflections of emitted light pulses, but from background ambient light or other falsely triggered pulses in, for example, a SPAD pixel. "Received light pulses" will refer to either the actual reflections of emitted light pulses or such erroneous detections of ambient light. Even detections of actual reflected emitted light pulses may show statistical variation in the discrete subinterval during which they are detected. This is indicated by the first TOF 414A being counted in the bin 414B, and the second TOF 418A being counted in the bin 418B. Over the large number of PRIs, the statistical variation of the TOFs of the reflected light pulses may produce a peak 422 in the histogram that is above the background noise level 424 of detected light pulses not arising as reflections of emitted light pulses. The discrete subinterval corresponding to the peak 422 can then be taken as the TOF and used to obtain the distance to the object.

The method just described counts each signal of a received light pulse equally. Embodiments to be described below apply a weighted counting.

Even with such a statistical calculation, there are still at least the two challenges previously mentioned for objects far and near in the field of view. For far objects, the reflected light pulses would be detected during discrete subintervals of the PRIs that are toward the right end of the bottom graph in FIG. 4A. But reflected light pulses from a far object typically are reduced in intensity due to absorption and other losses. Fewer arriving reflected photons are likely to be detected. Consequently, it may be more difficult to detect a peak in the histogram corresponding to the TOF to and from the far object.

Referring again to FIG. 3, when an object 310 is sufficiently far from the SPAD detector 302, as just explained it is less likely that a photon within a reflected light pulse will be detected during any one PRI. Over multiple PRIs, the probability of detection of a photon will have a distribution that matches the intensity distribution of the light pulse. As a result, in the absence of noise signals, the histogram would show a peak corresponding to very nearly the same time as the peak of the received intensity waveform of the reflected light pulse.

Figure 4B:
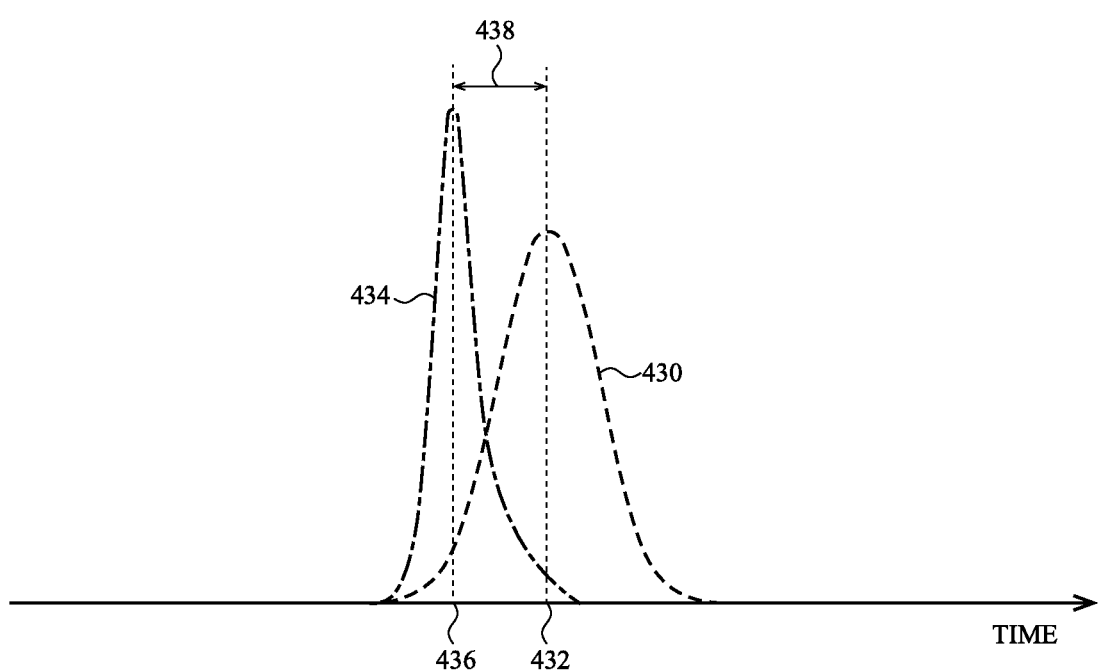
FIG. 4B shows a bias in detected arrival times of photons due to saturation of SPAD pixels.

FIG. 4B illustrates a second reception problem that can arise for near object 314 of FIG. 3 that can produce a bias in the statistically estimated TOF. For a near object, the reflected light pulse would be expected to impinge on the pixel with the intensity waveform 430, having a peak intensity at time 432. However, the reflected light pulse from near object 314 may include a large number of photons, even in its leading edge. For a SPAD pixel in particular, the photons in the initial part of the intensity waveform 430 would be more likely to be detected and cause the reversed biased diode to saturate. After one or more photons are detected by triggering an avalanche in a SPAD, the SPAD enters a recovery or dead time period during which the SPAD does not detect or respond to other incident photons. Typically, a dead time period means a SPAD is "blind" to subsequent photons for that amount of time. A dead time period is typically 10-100 nanoseconds, which means a SPAD is "blind" to subsequent photons for that amount of time. As a result, the probability that a SPAD will detect photons is higher in the leading portion of the received reflected pulse when compared to the trailing portion of the received reflected pulse. While the same skew is possible with photons reflected from an object that is far from the SPAD detector, the reduced probability of a particular SPAD detecting any photon in any one reflected pulse implies that over multiple PRIs, the particular SPAD may detect photons with less bias toward those photons of the leading portion. For an object far from the SPAD, any residual skew or bias would produce a smaller relative error in an estimated distance to the object.

The result may be that photons received at time 432 and thereafter do not cause a current or output from the SPAD pixel. As a result, the counts of arrival times would be biased toward the early arriving photons in the light pulse, and so have the skewed and narrower graph 434, which has a peak magnitude at time 436. As a result, there is a bias or offset between the true peak time 432 of the intensity waveform 430 of the received reflected light pulse and the time 436 of the peak of the arrival times inferred from the narrower graph 434. For example, in some embodiments the received intensity waveform 430 has a width (such as a full width at half maximum, FWHM) of approximately 2 ns, and the bias 438 is approximately 1 ns. This bias in a TOF can result in an error of approximately 15 cm for the distance. This may be unacceptable for some situations, such as for autofocusing on a digital camera.

The operations discussed in relation to FIGS. 4A-4B relate to a situation with just an emitter and a single pixel. However, as discussed in relation to FIG. 2, the emitted outgoing light pulses are swept over the FOV. The reflected light pulses then will not always be received by a single light sensing pixel. As will now be explained, the operations described in relation to FIGS. 4A-4B can be adapted for detection and distance determination using an array of photodetecting pixels, such as in a SPAD detector. Methods for mitigating the problems just discussed with respect to near and far objects will then be discussed.

Figure 5A:
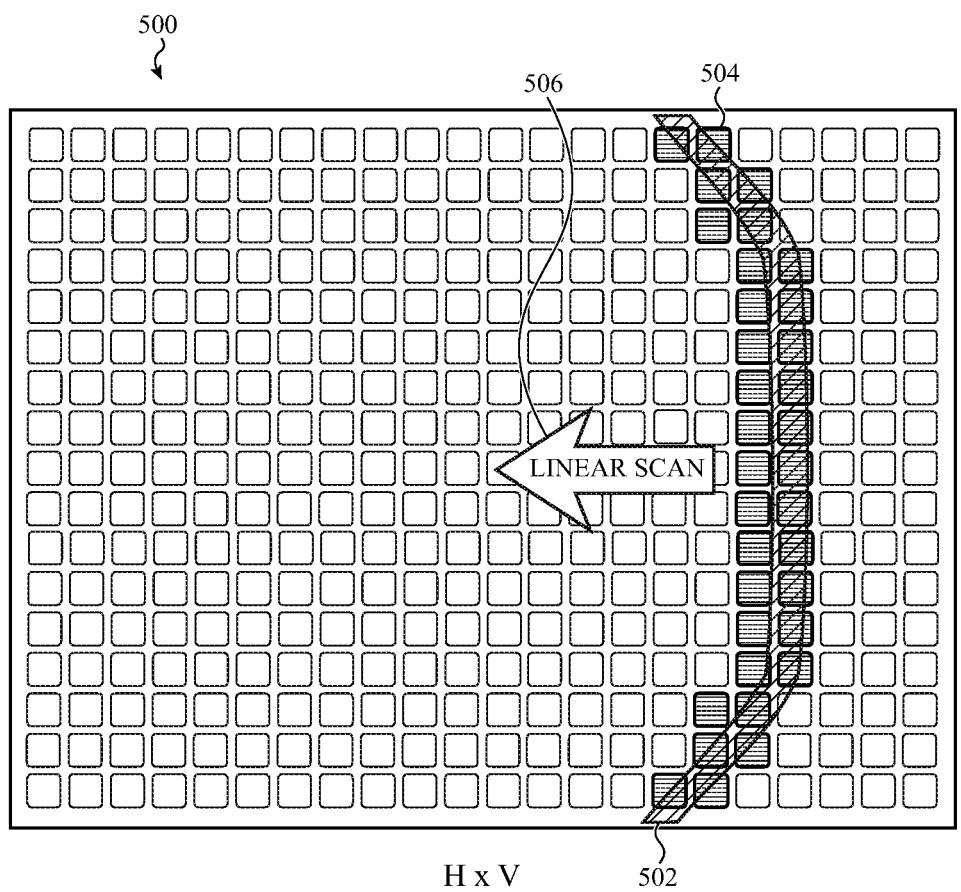
FIG. 5A shows a photodetector array and scanned pixels.

FIG. 5A shows an exemplary photodetector array 500, having H many pixels per row, and V many pixels per column. The individual light sensing pixels may use SPADs, as described above. The photodetector array 500 is part of scanning depth sensor in which the emitted light pulses are swept over the FOV, such as by the line scan system discussed in relation to FIG. 2. The emitted sequence of pulses can then be reflected from an object in the FOV and form a sequence of reflected pulses that sweeps across the photodetector array 500.

FIG. 5A shows a subset 504, indicated by cross-hatching, of the pixels in the photodetector array 500. The subset 504 of the pixels includes those pixels on the path 502 made by the beam of reflected light pulses during one sweep of the beam across the photodetector array 500. The path 502 of the beam may not be straight due to distortions or imperfections caused, for example, by the lens 216. In some cases, such as by device calibration, the path 502 may be known, at least approximately, by initial calibration of the scanning depth sensor.

For a scanning depth sensor sweeping the FOV, the beam of reflected light pulses may stepwise move from right to left, as indicated by the arrow 506, with the beam sweeping vertically in each step. When the traversal pattern of the beam is known, only those light sensing pixels in the anticipated location of the beam need to be activated for reception of the reflected light pulses. This can allow for a reduction in power use by the photodetector array 500 but requires timing and location determination of the paths of the reflected beam across the photodetector array 500.

In some embodiments, approximate determination of the time and location of the path 502 of the beam on the photodetector array 500 can be provided by processing that occurs off the photodetector array 500. For example, when the scanning depth sensor is used with a line scan system as in FIG. 2, the position of the beam-steering element 208 and information about the lens 216 can used, such as by processing device 108, to obtain an estimate for where on the photodetector array 500 the reflected beam will strike. Other methods may additionally be used to obtain more accurate determinations of the reflected beam's location on the photodetector array 500. Accurate location determinations can also be used to obtain an arrival time of reflections of the sweeping beam at a particular pixel.

Figure 5B:
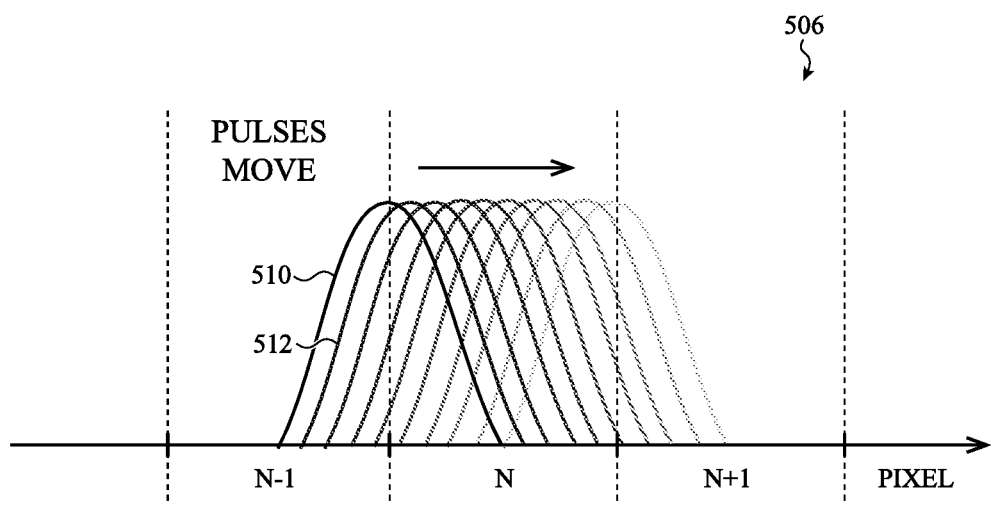
FIG. 5B shows shifting of multiple reflected light pulses across a column of pixels in a photodetector array.

FIG. 5B shows a series of reflected light pulses 510, 512 having peak positions sweeping across three successive light sensing pixels as the beam traverses a column of the photodetector array 500. In the example, it is desired to obtain TOF information using the pixel N, 506, as discussed above in regard to FIGS. 4A-4B. To do so, the pixel N is to be activated during the time in which reflected light pulses can be expected to land on it.

Figure 5C:
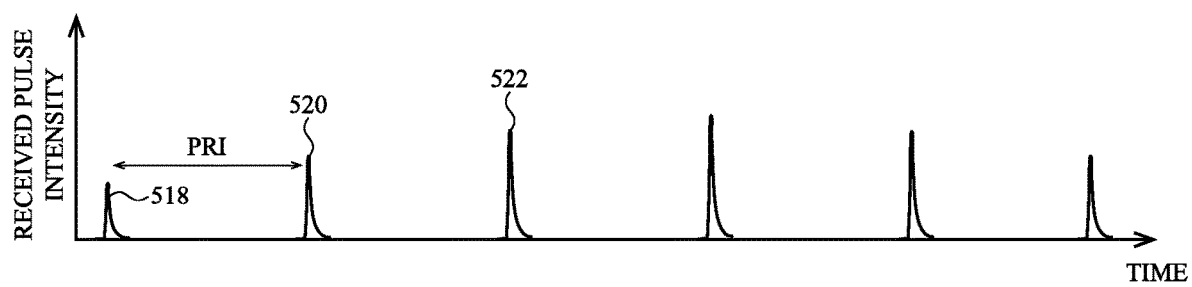
FIG. 5C shows a graph of light intensities of received reflected light pulses at one pixel.

FIG. 5C shows a graph of the received intensity of the reflected light pulses shown in FIG. 5B as they track across the pixel N. A reflected light pulse that only partly overlaps or impinges on pixel N, such as reflected light pulse 510, is only detected with a small intensity 518. As the beam of reflected light pulses traverses pixel N, more of the light (e.g., number of arriving photons hitting a SPAD) of the reflected pulses is received, producing a greater intensity 520. When the beam impinges directly and/or centrally on pixel N, the reflected light pulses can produce output signals with a maximum intensity 522. As the beam continues to sweep across toward pixel N+1, the intensities received at pixel N begin to fall.

Figure 5D:
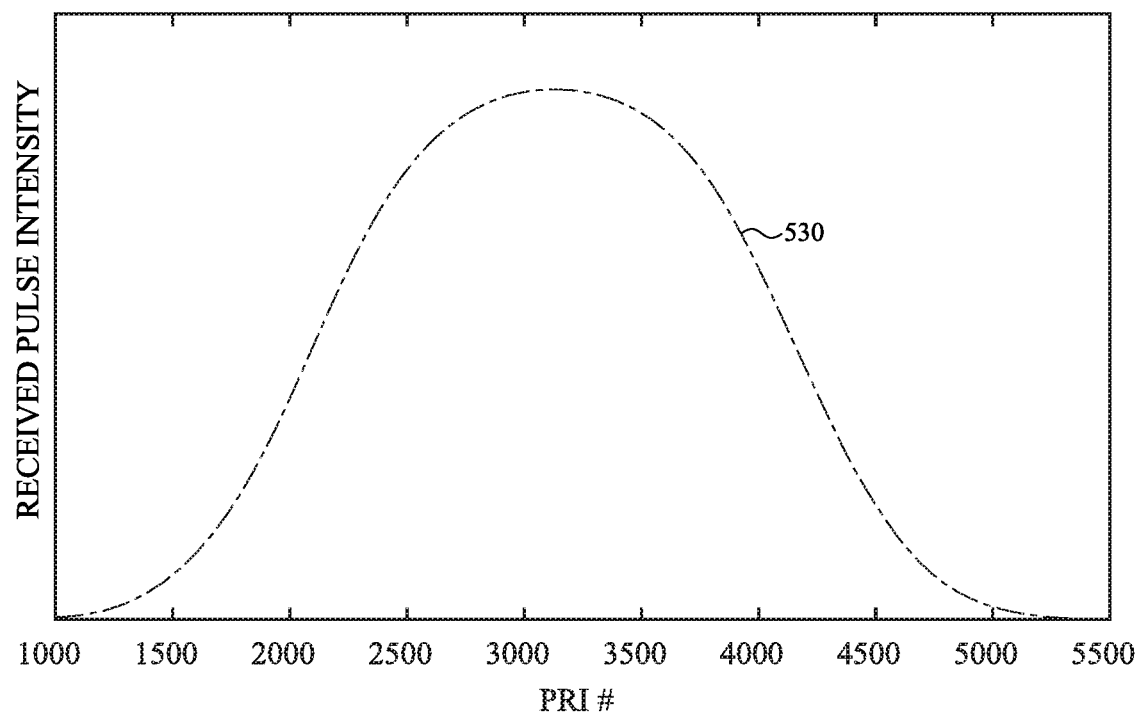
FIG. 5D shows a graph of light intensities of received reflected light pulses received at one pixel in a photodetector array against the pulse repetition interval (PRI).

FIG. 5D shows a plot of received reflected light pulse intensities 530 received at pixel N (vertical axis) versus a position number of the PRIs of the emitted light pulses (horizontal axis). FIG. 5D indicates that coordination and/or synchronization of the PRI number with the pixel at which the respective reflected light pulses are received can be used to select output signals that would produce a stronger histogram peak 422—and thus a better TOF estimate—for that pixel. Such a selection process will now be explained.

Figure 6:
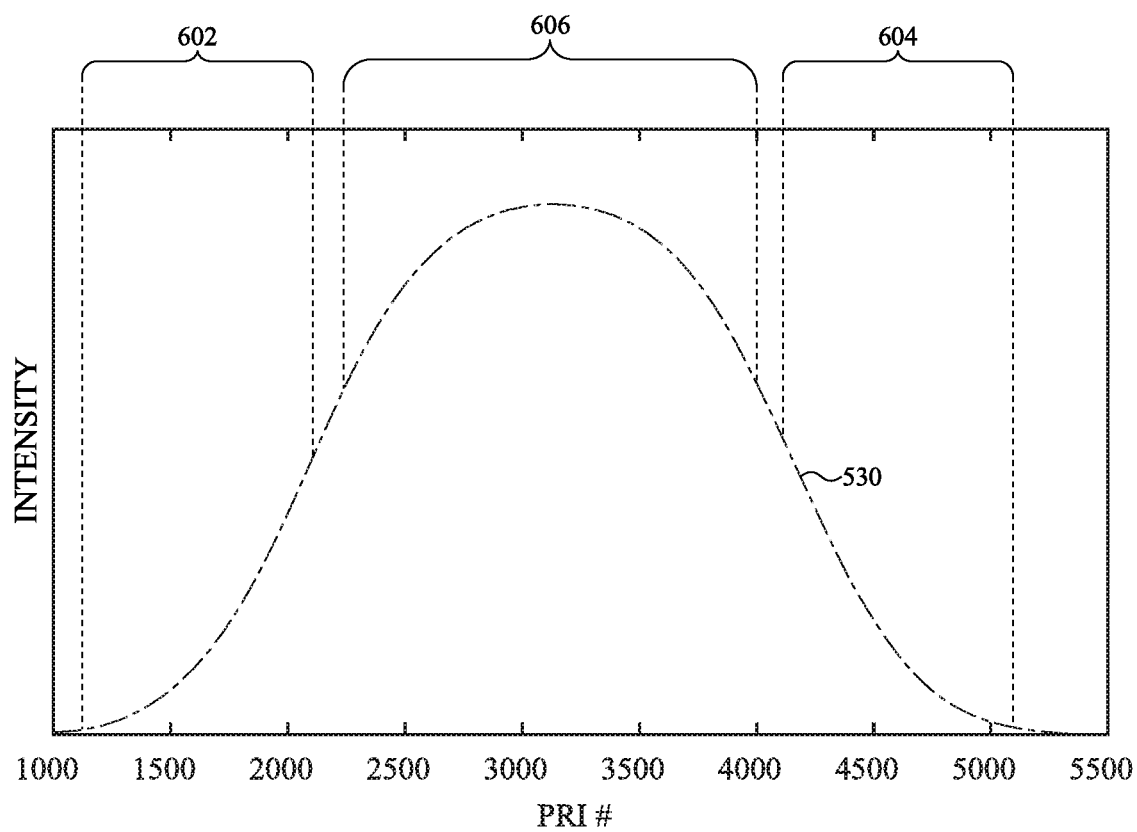
FIG. 6 identifies sections of the graph shown in FIG. 5D.

FIG. 6 identifies sections of the plot of intensities of the received reflected light pulse intensities 530 shown in FIG. 5D. The received reflected light pulse intensity increases as the reflected light pulses become more centered on the receiving pixel, as explained in relation to FIGS. 5B-C. During the PRIs of the arriving peripheral section 602, the reflected light pulses begin to overlap the receiving pixel, but only slightly or partially, so that the intensity of the received reflected light pulse on the pixel is correspondingly weak. During the PRIs of middle section 606, as the emitted light is swept across the FOV, the reflected light pulses will overlap the pixel more completely, so that the received reflected light pulse intensity on the pixel increases to a maximum. Then, during the PRIs of exiting peripheral section 604, as the emitted light continues to be swept across the FOV, the reflected light pulses have progressively less overlap with the pixel, so that the received reflected light pulse intensity on the pixel decreases.

Depending on the distance of the object in the FOV from the scanning sensor, either output signals from received reflected light pulses that are in PRIs of the peripheral sections 602 and 604, or those from PRIs in the middle section 606, may yield more accurate TOF values for building a histogram. The difference in accuracy may result from the distance of an object in the FOV.

The received reflected light pulses of the middle section 606 of the PRIs arrive at the pixel with a maximum of expected intensity and so will have higher signal to noise ratio than received reflected light pulses in the peripheral sections 602 and 604. When the object is either of middle or far distance in the FOV, such received reflected light pulses could be expected to yield better TOF values, and so should be emphasized in a counting of the TOF values. However, when the object is close within the FOV, the bias problem in the TOF values discussed above in relation to FIG. 4B indicates that received reflected light pulses in the middle section 606 are less useful for a correct determination of distance. Instead, for a close object, the received reflected light pulses from the peripheral sections 602 and 604 would be less likely to produce a biased TOF, and so TOF values for them should be emphasized.

Figure 7:
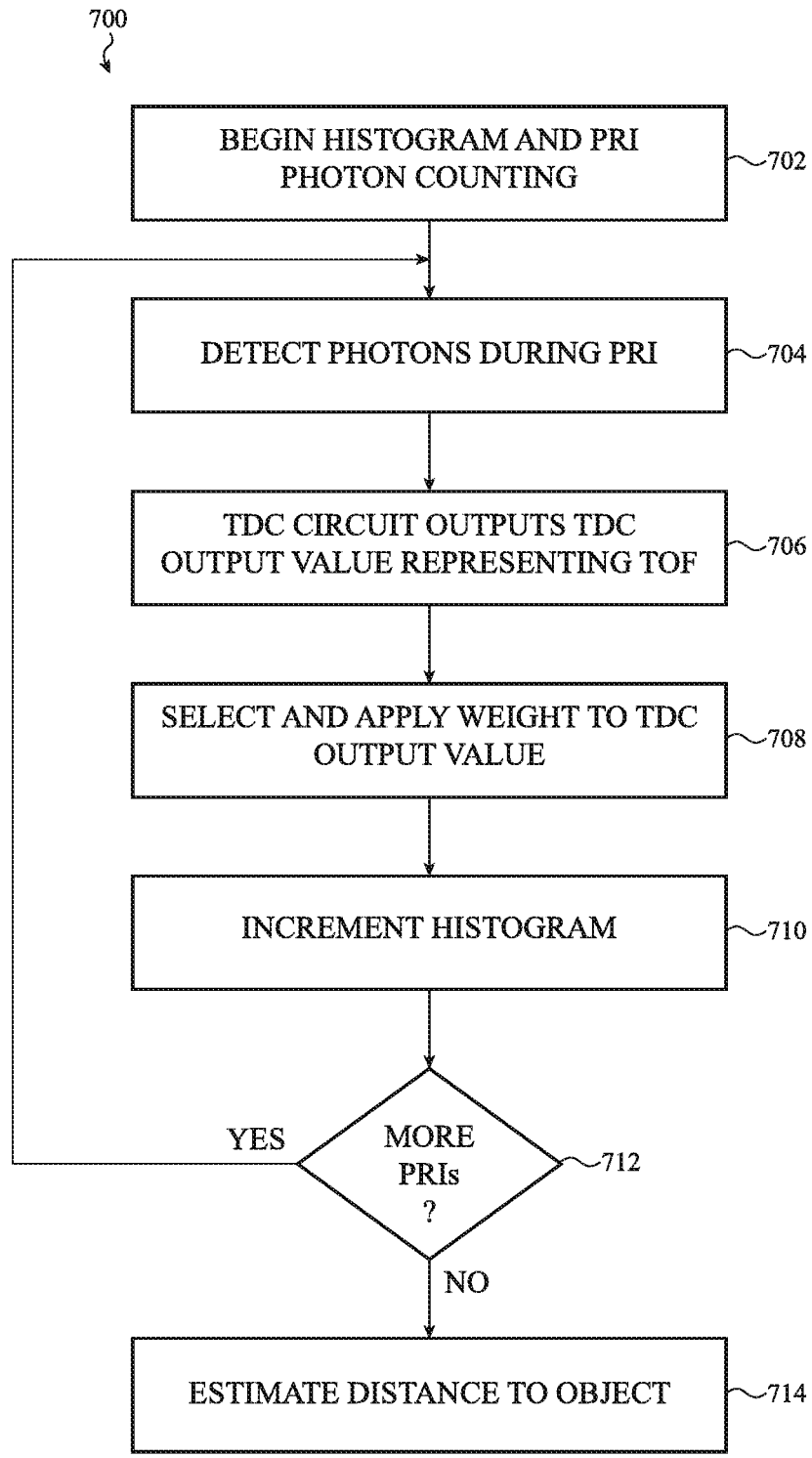
FIG. 7 shows a flowchart of a method of operating a SPAD detector.

FIG. 7 is a flow chart of methods 700 used by various embodiments to estimate distance to an object. The methods take account of the relative advantages and/or disadvantages of the received reflected light pulses from the various sections by using a weighted count of the output signals from a pixel, such as a pixel used in a SPAD detector.

At stage 702 a pixel is activated to begin detection of received light pulses. A processing device may have determined that reflections of emitted light pulses are beginning or about to begin overlapping the pixel. A histogram is also activated to begin receiving counts of TOF values corresponding to received light pulses. The histogram can be implemented as a block of memory locations that each store and update a count value. The number of memory locations can equal a number of discrete subintervals of time of the PRI, as explained below. The process described as follows for one PRI is repeated for all PRIs in a sequence of PRIs, the sequence of PRIs being those for which a reflected light pulse from an object can be expected to impinge on the pixel. This coordination of pixel activation with expected reflected light pulses may be accomplished by a processing device, such as processing device 108. In the illustrative embodiment discussed in FIG. 6, the sequence of PRIs includes 6000 PRIs. Other embodiments may have more or fewer PRIs in the sequence of PRIs in which a reflected light pulse could strike the pixel. Each PRI within the sequence of PRIs has a position number, or just "position," in the sequence of PRIs.

In stage 704, during one PRI, the pixel is active and may detect photons, either from an actual reflection of the emitted light pulse of that PRI, or from another source, such as an ambient light source. In the event of reception of received light pulse or signal, the pixel can produce an output signal that can be received by an analog front end (AF) circuit and conditioned before being sent to subsequent circuitry. Such signal conditioning can include amplifying by transistors and buffering.

At stage 706, a time-to-digital converter (TDC) circuit determines a time-of-flight. Recall that a TDC circuit may operate by cyclically counting the number of completed discrete subintervals within each PRI. The TDC can be triggered to stop counting upon reception of the output signal from the AF circuit. The number of completed discrete subintervals, multiplied by the length of time of the discrete subintervals, then is taken as the TOF for the received light pulse. When there are N many discrete subintervals of equal duration, the duration is the period of the PRI/N. If the discrete subintervals used do not have equal duration, the TOF is taken as the sum of durations of the previous discrete time subintervals. In some embodiments, the TDC could then trigger a counter to update the count value in memory location of the histogram. However, just updating a count by 1, as can be used in some embodiments in certain conditions, would not account for whether the object is near or far, nor for the intensity of the received light pulse.

At stage 708, instead of updating a bin of the histogram count by 1, a weight is selected and the histogram will store a weighted count. The weight is a number which may be different from 1 and which reflects how much to emphasize a TOF value when updating the histogram. Weights may be real-valued or integer valued, depending on data types used in the histogram. For example, if it is determined that the weight should be 2, reflecting a strong emphasis for the TOF value, the histogram location corresponding to the TOF is updated by 2, rather than 1. In another example, if instead the weight is determined to be 0.6, reflecting less confidence that the received light pulse that produced the TOF actually arose as a reflection from an object, the corresponding location in the histogram would only be updated with 0.6. In some embodiments, the weight is selected based on information about the position of the PRI in the sequence of PRI, and/or on the TOF value, as explained below.

At stage 710 the histogram is updated based on the TOF and the determined weight. The circuitry may be formed so that the memory address of the histogram corresponding to the TOF can be quickly accessed and updated.

At stage 712, the method either repeats if there are subsequent PRIs in the sequence of PRIs for the pixel, or else terminates and proceeds to the next stage. At termination the completed histogram contains weighted counts corresponding to each TOF.

At stage 714, from a completed histogram an estimate is made for a distance to an object in the FOV. In some situations, such as if no TOF value in the histogram has a count that exceeds a threshold, the decision may be made that no object is detected in the FOV.

Figure 8:
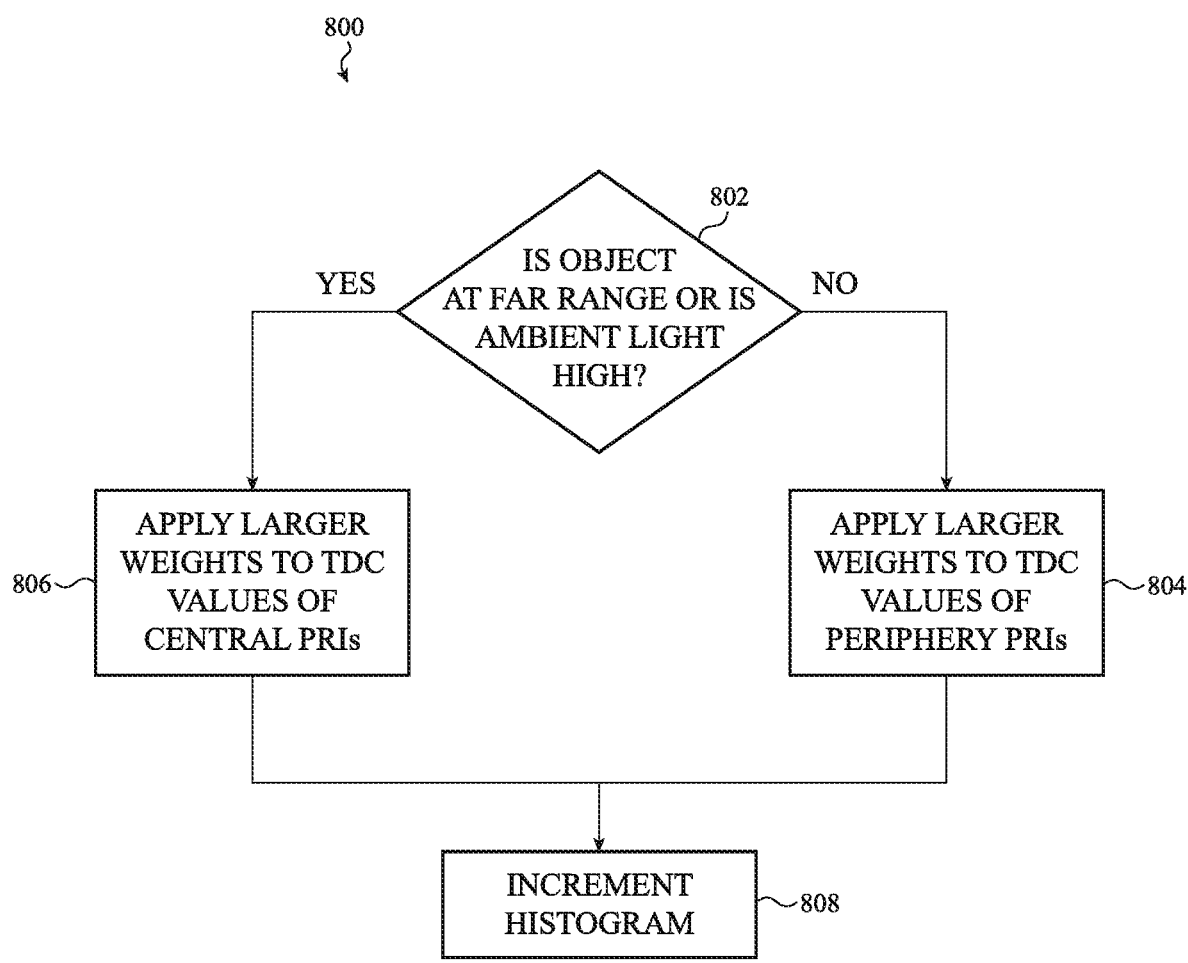
FIG. 8 shows a flowchart of a first example method of applying a weight to a TDC output value.

FIG. 8 is a flow chart 800 for methods of selecting or determining weights to use with a TOF value, such as in stages 708 and 710 of the flowchart shown in FIG. 7. The methods may make use of prior knowledge about an object's distance within the FOV. Such prior knowledge may be obtained by auxiliary components or devices that obtain only approximate distance information about the object, such as an echo locator, or by sampling the scene with a scanning sensor. Another way that such prior knowledge may be obtained is to use distance estimates made by one or more pixels to which the method of FIG. 7 was previously applied. A third way uses the methods described below in relation to FIGS. 11 and 12.

At stage 802 a decision is made from received information about whether an object is at a far range within the FOV or that there is a high level of ambient light. If neither condition holds, then at stage 804 higher weight values are applied to TOF values arising from received light pulses detected at the pixel during PRIs from the peripheral sections (i.e., not in the middle section of PRIs in the sequence of PRIs) 602 and 604. Those TOF values will more likely not have the bias in the TOF discussed above. As in this case the ambient light is also low, a TOF arising from a low intensity received light pulse at the pixel is more likely to be from an actual reflected pulse from an object. Consequently, it can be emphasized more in the weighted count; for example, by incrementing the histogram location for that TOF by a weight greater than 1.

In the case of stage 804, a TOF value produced from a received light pulse during a PRI within the middle section 606 may be more likely to have a bias in its reception time, i.e., its TOF. Such TOF values may either be discarded entirely (i.e., a weight of 0 is assigned to it), or it can be counted in the histogram with a weight less than 1.

If, instead, at stage 802 it is determined that the object is at a far range in the FOV, or that ambient light is high, then those TOF values produced from light pulses with reduced intensity detected during a PRI of the peripheral sections 602 and 604 are more likely to be erroneous values. In this case flow passes to stage 806.

At stage 806, a TOF value arising during PRIs from the middle section 606 would be more likely to have arisen as an actual reflection from an object of the emitted pulse of that PRI. So a larger weight is selected for updating the count in the histogram for that TOF.

From both stages 806 and 804, flow passes to stage 808 the histogram is updated using the determined weight. Flow may then proceed to stage 712 of the method 700 of FIG. 7.

In these methods the weight selected for a TOF during a particular PRI uses at least the position of that PRI within the sequence of PRIs. At least two lists of weights may be used: a first for the weights to be used in stage 804 and a second for the weights to be used in stage 806.

Figure 9:
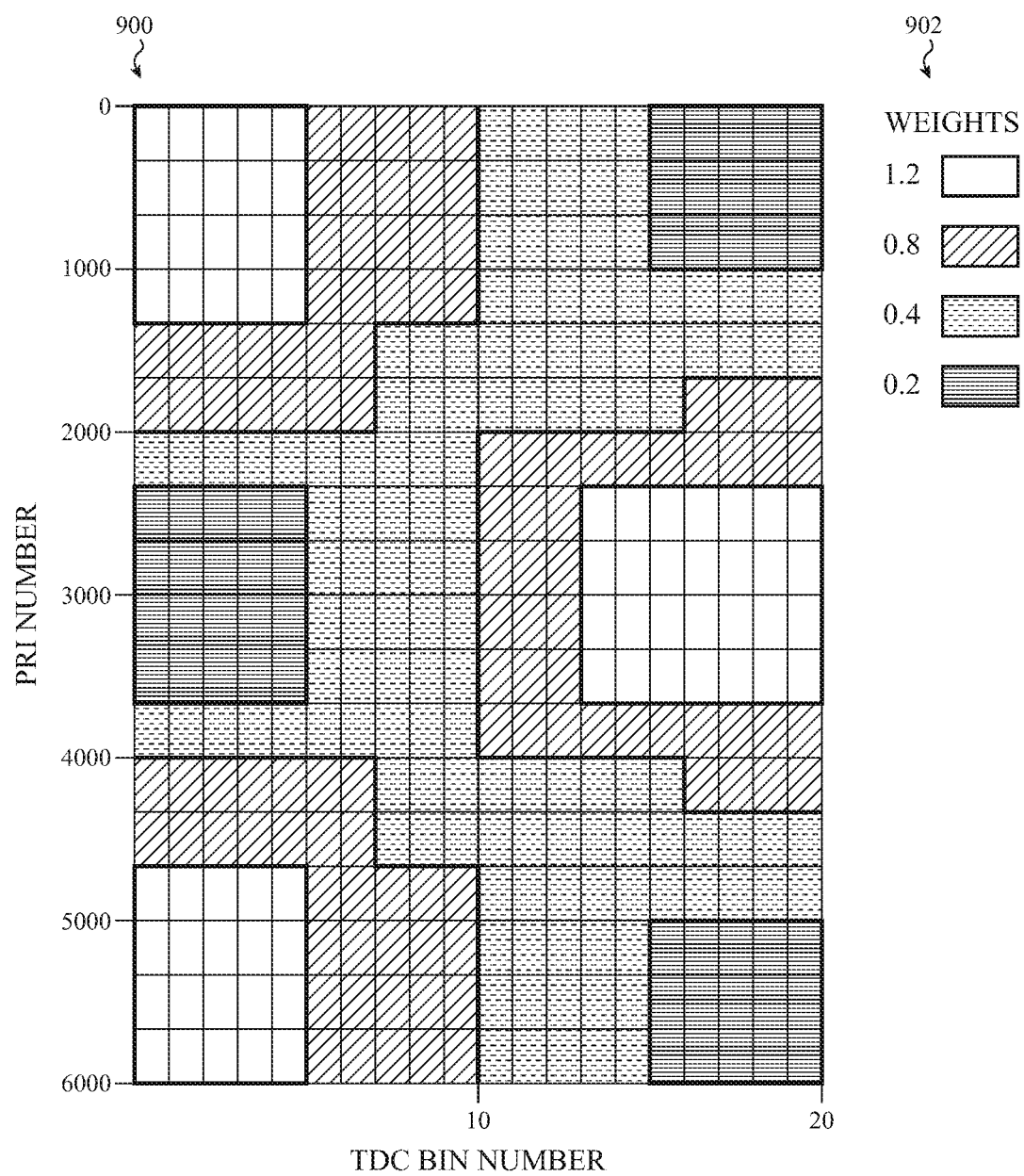
FIG. 9 illustrates a look-up table of weights for TDC values, given a PRI position number and a TDC histogram bin number.

FIG. 9 shows an example of a look-up table (LUT) 900 of weights for use in various embodiments disclosed herein.

The vertical axis is the PRI position number, or just "position," within the sequence of PRIs that traverses a pixel. The PRI numbers of the LUT are for the example shown and discussed with respect to FIGS. 5D and 6. PRI positions from 0 to 2000 correspond to the peripheral section 602 of FIG. 6, positions 2001 to 4000 correspond to the middle section 606 of FIG. 6, and positions 4001 correspond to the peripheral section 604 of FIG. 6.

The horizontal axis gives the TDC histogram bin number that results when a received light pulse is detected during the corresponding discrete subinterval of time of the PRI.

The shown four levels of shading 902 in the LUT 900 indicate the weight value corresponding to each index pair, an index pair being one TDC histogram bin number and one PRI number. While the example 900 only depicts four weights for simplicity, one of skill in the art would recognize that more or fewer weights can be used in such a LUT, that different weight values may be used, that there may be more or fewer than 20 TDC histogram bin numbers, and that more or fewer than 6000 PRIs within a sequence of PRIs for a pixel.

The columns on the right side of the LUT correspond to received light pulses detected in one of the late discrete subintervals within the PRI, i.e., having a long time-of-flight (as a fraction of the PRI). As such, a column from the right side of the LUT can be used as the weights for stage 806. The weights as listed down the rightmost column of the LUT 900 increase from low weights to large weights in the middle section of PRIs, and then decrease back to low weights. Thus the weights can emphasize or weight higher count values to the histogram for received light pulses detected during the middle section, and decrease or weight lower the count values for received light pulses from the peripheral sections of the sequence of PRIs.

Analogously columns toward the left or center of the LUT correspond to received light pulses detected during one of the early discrete subintervals within the PRI, and so would indicate a reflected pulse having short or moderate time-of-flight. The weights as listed down the leftmost column of the LUT 900 decrease from large weights to low weights in the middle section of PRIs, and then increase back to large weights. Thus the weights can emphasize or increase count values to the histogram for received light pulses detected during the peripheral sections of the sequence of PRIs, and decrease the count values for received light pulses from the middle section of the sequence of PRIs.

Figure 10:
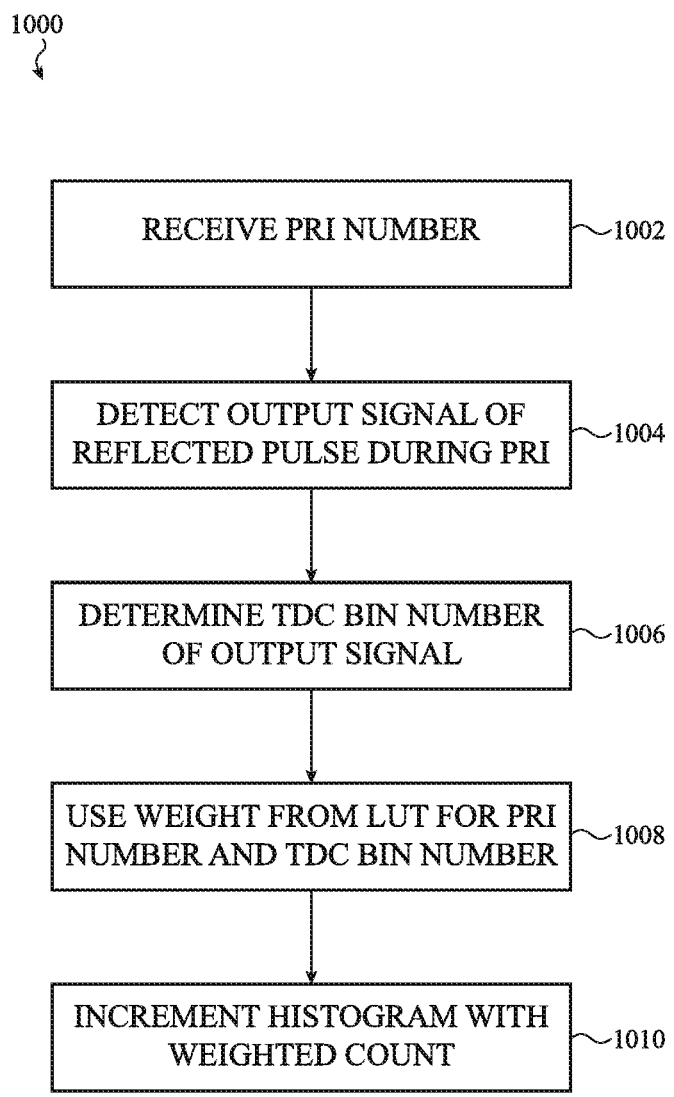
FIG. 10 is a flowchart of a second example method of applying a weight to a TDC output value.

FIG. 10 is a flow chart 1000 of methods for determining weights to be used, such as in stages 708 and 710 of FIG. 7. The determination of the weight is based on both the TDC bin number (equivalently, the TOF or the discrete subinterval) and the position of the PRI during which the received light pulse is detected. The methods may make use of an entire LUT as exemplified by FIG. 9.

At stage 1002 the position of the PRI is received. The position may be represented as an integer or fraction of the full length of the sequence of PRIs.

At stage 1004, the pixel is active to detect received light pulses or photons during the PRI. If no light pulse is detected, no TOF is created by the TDC circuit to add to the histogram.

At stage 1006, when a light pulse is detected at the pixel, the pixel's output is used by the AF circuitry to generate an output signal. The TDC circuitry can creates a value representing the discrete subinterval of the PRI in which the light pulse was detected. The value may be: an integer that counted the number of discrete subintervals of the PRI until the light pulse was received, an address or histogram bin number for the location in the histogram memory in which the count for the time-of-flight is updated and maintained, or another value that correlates with the time-of-flight. For explanatory purposes only, it will assumed that the TDC value is a histogram bin number.

At stage 1008, the position of the PRI and the TDC histogram bin number are used as indices to locate a weight in the LUT. The weights in the LUT may be of a data type compatible with the data types of the histogram.

At stage 1010 the histogram is incremented, in the location given by the TDC histogram bin number, by the value of the weight, or by the weight multiplied by another number.

The order in which the stages of FIG. 10 were shown does not imply a necessary temporal sequence. For example, stage 1002 could occur after stage 1004 or stage 1006.

An advantage of the method of FIG. 10 in some embodiments is that no preliminary knowledge of the distance to an object is needed for the selection of the weights. But it may require storing a complete LUT in the memory of the electronic device.

In additional and/or alternative embodiments to be described now, rather than obtaining preliminary knowledge of the distance to an object by external means, the sequence of PRIs itself can be used to obtain a preliminary detection of an object within the FOV.

Figure 11:
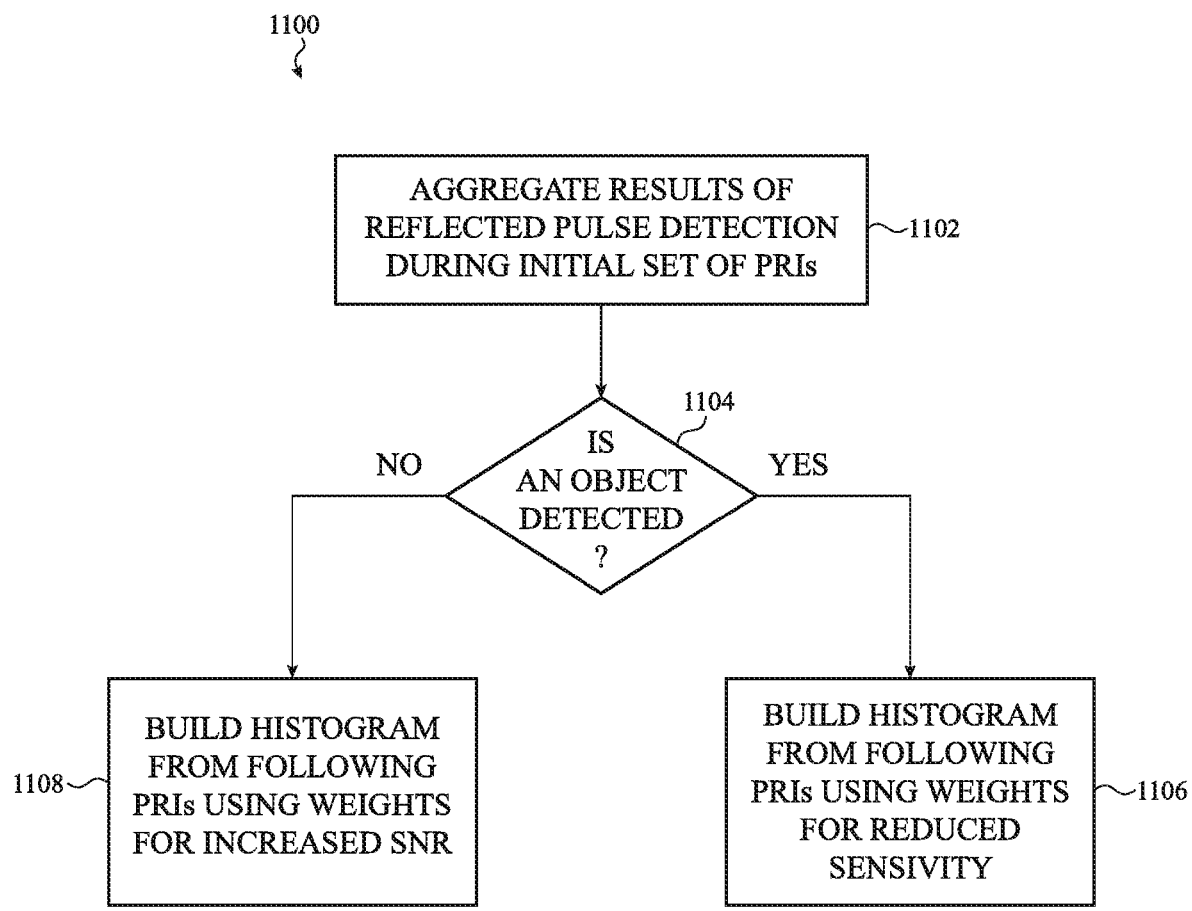
FIG. 11 is a flowchart of a third example method of applying weights to TDC output value.

FIG. 11 is a flow chart of a method of detection and distance determination of an object in a FOV. The method is based on the scanning operations discussed in relation to FIGS. 4A-6. As in previously discussed methods, the scanning operations include emitting outgoing light pulses or signals into a FOV and detecting reflected signals at light sensing pixels of a sensor. At a specific pixel, times-of-flight are obtained for the reflected signals that sweep across the pixel. The times-of-flight (TOFs) measure a time from the emission of a pulse at the beginning of each of the sequence of time intervals to the reception of a reflection of the outgoing pulse within the time interval. The TOFs can be measured based on which of a finite number of discrete subintervals of time of the time interval that the reflected pulse is received in.

The light sensing pixels of the sensor may be triggered by received light signals or pulses that are not actual reflections of the outgoing light signals or pulses. The sequence of time intervals for which reflections are expected at the pixel may be sufficiently numerous to permit a statistical detection of TOFs of actual reflections of the outgoing light signals above a background level that results from light pulses originating from ambient or other spurious sources. The detected TOFs can then be used to calculate a distance to the object in the FOV.

The methods of FIG. 11 will be discussed using the particular example of the sequence of PRIs shown and discussed in relation to FIGS. 4A-6. One of skill in the art will recognize how to use the methods for other examples.

At stage 1102, detections are made of TOFs of received light pulses during PRIs from an initial set of the PRIs for which a reflected light pulse could impinge on the particular pixel. The TOFs may be determined by a TDC circuit and its counts of discrete subintervals of time within each time interval. The TOFs may be weighted as described below, and then the weighted counts used to update a histogram. In the particular example of FIGS. 5D and 6, the initial set of PRIs may be the first 1000 of the 6000 PRIs in the sequence of PRIs. Other examples may include a different number of initial time intervals (i.e., PRIs) in the initial set. The number of PRIs in the initial set is called the decision point (DP). The DP may be set uniformly for all pixels in the sensor, or may be selected dynamically and/or differently for various sets of pixels during the scanning operation.

Because the PRIs in the initial set are from the beginning of the whole sequence of PRIs for the pixel, the reflected light pulses within those PRIs would likely only partially impinge on the pixel, and so are likely to be of low intensity. For example, they may be from the peripheral section 602 of the PRIs as shown in FIG. 6. So the TOFs can be weighted accordingly for counting in the histogram. As an example, weights from a column on the left side of the LUT shown in FIG. 9 may be used to form the aggregated count of the TOFs determined during the initial set of PRIs. Such a list of weights is also shown as list 1202 in FIG. 12.

At stage 1104, the aggregated counts of TOFs are used to determine if an object is in the FOV, and if so, in some cases determine an initial estimate for the distance to the object. The decision as to whether an object likely is in the FOV can be made on the basis of the histogram made using just the aggregated counts of TOFs calculated during the initial set of PRIs. As shown in FIG. 4B, a single peak within the aggregated counts that exceeds a threshold above the background or noise count level can indicate the presence of an object. If the peak is sufficiently strong and precise, the peak TOF can be used to obtain a preliminary estimate of the distance to the object. Once the determination is made regarding the likely presence of an object in the FOV, flow passes either to stage 1106 for a positive determination, or to 1108 for a negative determination. In both cases the embodiments continue to detect and determine the TOFs of light pulses arriving in PRIs subsequent to the initial set of PRIs. The two cases differ in how those TOFs of subsequent time intervals are weighted and counted.

At stage 1106 a positive determination has been made that an object likely is in the FOV. Since the positive determination was made based on TOFs from time intervals in a leading peripheral section of the sequence of time intervals and the weights used to form the aggregated counts emphasized TOFs that would arise from an object near in the FOV, such a positive determination is more likely when there actually is both an object in the FOV and it is within a close distance to the sensor. Hence, some embodiments then proceed by continuing to detect the TOFs and use weights appropriate for near objects, such as weights from a column on the left in FIG. 9. These weights may be the weights already used with the initial set of PRIs to form the aggregated weighted counts used for the decision. A first embodiment continues using those weights and adding weighted counts to the already existing histogram during all subsequent PRIs past the DP, and then estimating the distance to the object from the sensor based on the resulting final histogram. A second embodiment begins by clearing the histogram and adding the weighted counts of TOFs from the subsequent PRIs to the histogram. A third embodiment begins by clearing the histogram and selecting a new set of weights that also emphasizes those TOFs for near objects, such as different columns from the left in FIG. 9. Then weighted counts are added to form a new histogram during subsequent PRIs past the DP. The distance from the sensor to the object is then based on the new histogram, as previously described.

At stage 1108 no object has been reliably detected in the FOV. There are at least two reasons for this: there is no object in the FOV, or there is an object in the FOV but it was not detected based on the histogram formed during the initial set of PRIs. The latter case may be due to the weights used, which emphasize TOFs of near objects, and/or the object being at a far distance in the FOV.

The embodiments used in the case at stage 1108 select a new weight set to use with TOFs detected during subsequent PRIs past the DP. The new weight set can be chosen to emphasize TOFs arising from the middle section of the sequence of PRIs. For example, the new weights may be from a column to the right in FIG. 9, and shown as the list of weights 1204 in FIG. 12. A new histogram for the weighted counts of the TOFs is formed, and the weighted counts are added to the histogram over the subsequent PRIs. The distance from the sensor to the object is then based on the new histogram, as previously described.

Figure 12:
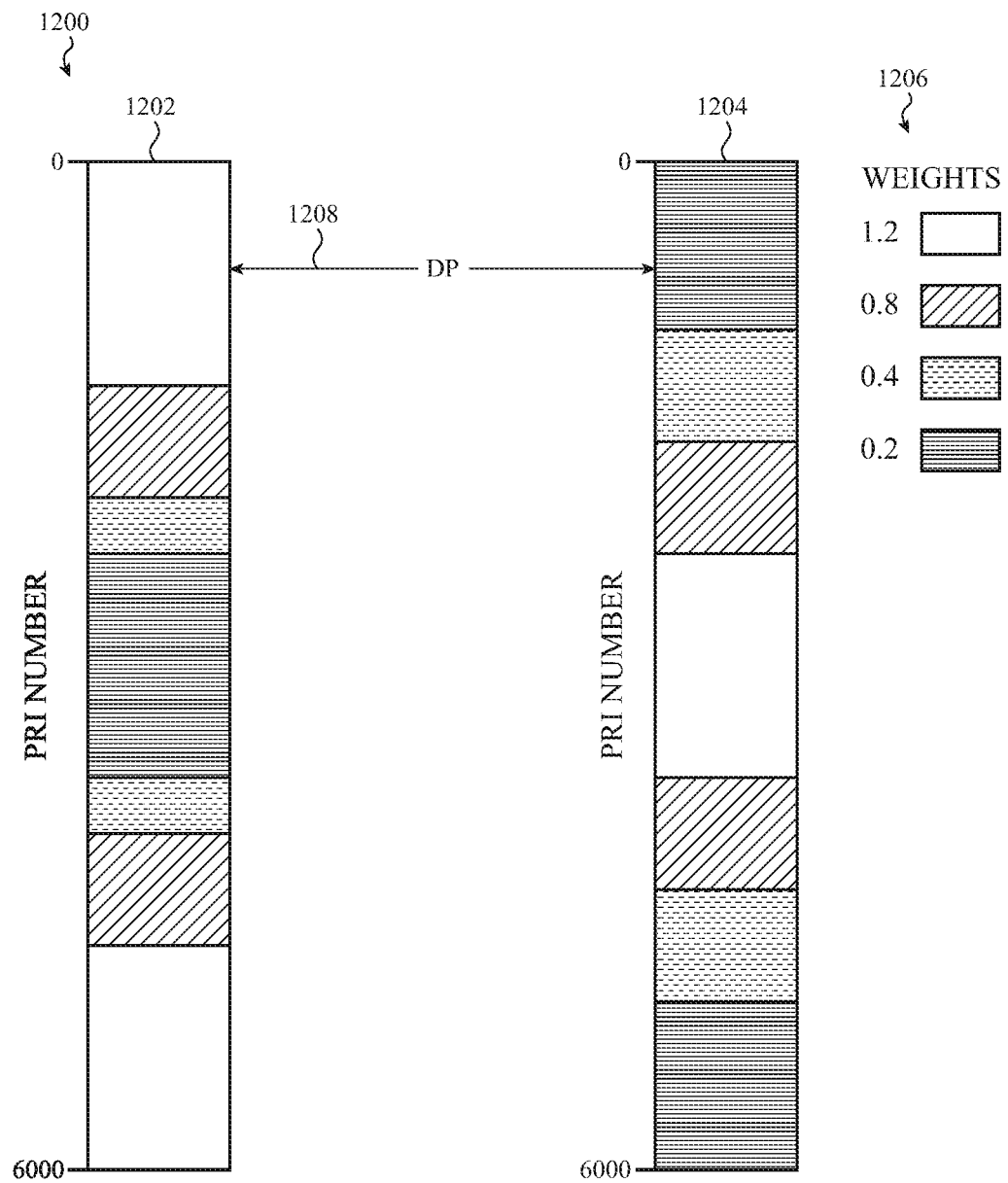
FIG. 12 illustrates two look-up tables of weights for TDC values, given a PRI position number and a TDC histogram bin number.

FIG. 12 shows two lists of weights 1200 that can be used in the methods of FIG. 11. The weights shown are for the example of FIGS. 5D and 6, in which the total number of time intervals or PRIs for a pixel is 6000. In other examples the two lists of weights can be different.

The list of weights 1202 is from a column to the left in FIG. 9, e.g., column 03. As such, larger weights are applied to TOFs from peripheral sections of the PRIs. The exemplary values of the list of weights 1202 is listed in the included chart 1206. The weights from 0 to the decision point (DP) 1208 are used with the TOFs in the initial set of PRIs used to form the aggregated weighted counts.

The list of weights 1204 is from a column to the right in FIG. 9, e.g., column 18. As such, larger weights are applied to TOFs from the middle section of the PRIs. The exemplary values of the weights 1204 is listed in the included chart 1206. The list of weights 1204 can be used in the embodiments of FIG. 11 for the weights applied to TOFs subsequent to the initial set when an object was not reliably detected.

Figure 13:
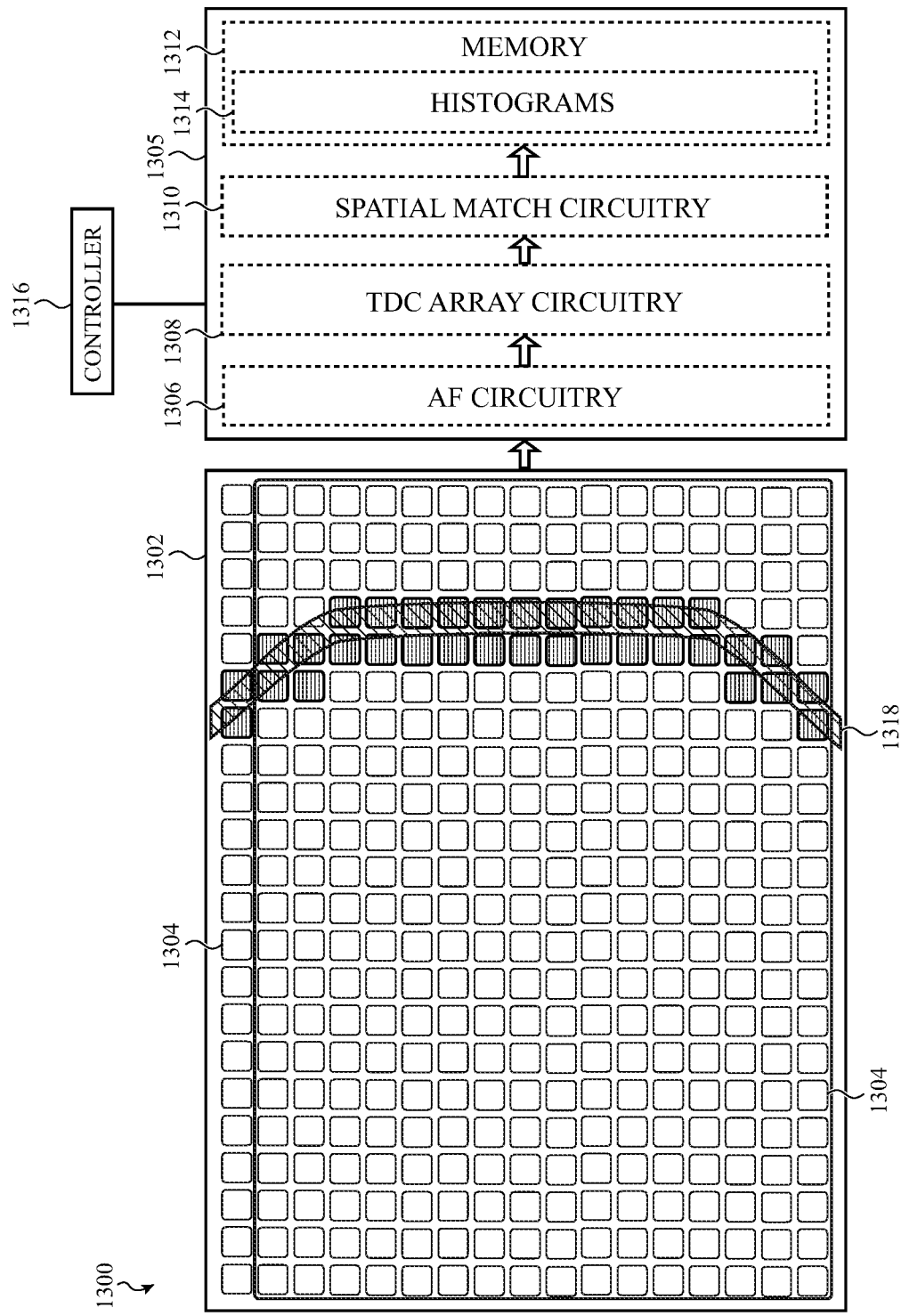
FIG. 13 shows a block diagram of one example of SPAD detector that can use one or more of the spatial temporal weighting schemes.

FIG. 13 shows a block diagram of one example of a SPAD detector that can be used with one or more of the spatial temporal weighting schemes. The SPAD detector 1300 includes a pixel array 1302 that has multiple pixels 1304, where each pixel 1304 includes a SPAD. The pixel array 1302 is operably connected to read out and control circuitry 1305. The read out and control circuitry may include one or more of the following sections: a row-level analog front-end (AF) circuitry 1306, time-to-digital converter (TDC) array circuitry 1308 operably connected between the AF circuitry 1306, and a spatial match circuitry 1310. A memory 1312 is operably connected to the spatial match circuitry 1310. The memory 1312 stores the histograms that are constructed for the SPADs in the pixels 1304 in histogram memories 1314. A controller 1316 is operably connected to the readout and control circuitry 1305, and may supply control signals or commands to the sections, such as the TDC array circuitry 1308.

In a line scan system, the pixel array 1302 can be read out in a scan-by-scan readout process. The pixel array 1302 can also be read out on a section-by-section basis in systems using a moving illumination source. In other words, the SPADs in the pixels 1304 of various sections of the pixel array 1302 (e.g., two or three columns of pixels) are enabled at respective times. In some embodiments, there may be multiple readouts of individual pixels (e.g., for individual pulse-based measurements) within a scan operation, so that readout is not performed section-by-section. A representative reflected light beam 1318 is shown impinging on the pixel array 1302, and the pixels with the cross-hatching represent the pixels whose SPADs are enabled to detect the photons in the reflected light beam 1318.

The SPAD may be in one of at least three states: an "enabled," or "activated," state in which the SPAD section is reverse biased sufficiently so that any received photon can trigger an avalanche output signal; an idle state in which power is supplied to the components of the pixel but not to the extent that a photon impinging the SPAD can trigger an output signal; and an unpowered state (e.g., no reverse bias is applied to the SPAD). A disabled state encompasses both the idle and unpowered states.

The pixels with enabled SPADs constitute a subset of the pixels in the pixel array 1302. The pixels with enabled SPADs are arranged in a non-linear arrangement in FIG. 13. In particular, the pixels with enabled SPADs near the two horizontal edges of the pixel array form a curved (or offset, or staggered) pattern to account for the shape of the reflected light beam 1318 received from a lens. Other non-linear arrangements of pixels with enabled SPADs may comprise piecewise linear sections of such pixels, or at least one row with a set of one or more enabled pixels in one or more columns (but not in all columns), or adjacent rows with enabled pixels which may have one or more inactive rows positioned therebetween and/or enabled pixels in a same column (with enabled pixels in a column separated by one or more inactive rows).

The AF circuitry 1306 is configured to perform row-level signal readout for the pixel array 1302. The AF circuitry 1306 includes N AF circuits for each line of pixels (e.g., a row) in the pixel array 1302, where N represents the number of pixels read out at any given time in the line(s) of pixels. Thus, for the embodiment shown in FIG. 13, the AF circuitry 1306 includes two AF circuits for each row. In other embodiments, the number of AF circuits for each row may be N+W, where W represents one or more additional AF circuits. In one embodiment, the additional AF(s) can allow the SPAD detector 1300 to dynamically adjust the number of pixels that are used to detect the photons in the reflected light beam 1318.

The TDC array circuitry 1308 includes N TDC circuits for each line of pixels (e.g., a row) in the pixel array 1302, where N represents the number of pixels that are read out at any given time in the line(s) of pixels. Thus, for the embodiment shown in FIG. 13, the TDC array circuitry 1308 includes two TDC circuits for each row. In other embodiments, the number of TDC circuits for each row may be N+X, where X represents one or more additional TDC circuits. In one embodiment, the additional TDC array circuits can allow the SPAD detector 1300 to dynamically adjust the number of pixels that are used to detect the photons in the reflected light beam 1318.

The TDC circuits measure the arrival time of the photons impinging on the pixels to be read out (e.g., the pixels that are cross-hatched). Thus, the TDC output values represent the arrival times of the photons. As described earlier, the TDC output values are used to construct histograms for each SPAD in the pixels read out.

The spatial match circuitry 1310 includes N spatial match filter circuits for each line of pixels (e.g., a row) in the pixel array 1302, where N represents the number of pixels that are read out at any given time in the line(s) of pixels. Thus, for the embodiment shown in FIG. 13, the spatial match circuitry 1310 includes two spatial match filter circuits for each row. In other embodiments, the number of spatial match filter circuits for each row may be N+Y, where Y represents one or more additional spatial match filter circuits. In one embodiment, the additional spatial match filter circuits can allow the SPAD detector 1300 to dynamically adjust the number of pixels that are used to detect the photons in the reflected light beam 1318.

In one embodiment, the memory 1312 stores N histograms in N histogram memories 1314 for each line of pixels (e.g., a row) in the pixel array 1302, where N represents the number of pixels read out at any given time in the line(s) of pixels. In other embodiments, the number of histograms for each row may be N+Z, where Z represents one or more additional histogram memories 1314.

The controller 1316 can generate timing signals for the TDC array circuitry 1308. Any suitable controller can be used. For example, the controller 1316 may include ancillary circuitry to generate reference timing signals such as a phase-locked loop circuit or a delay-locked loop circuit.

Figure 14:
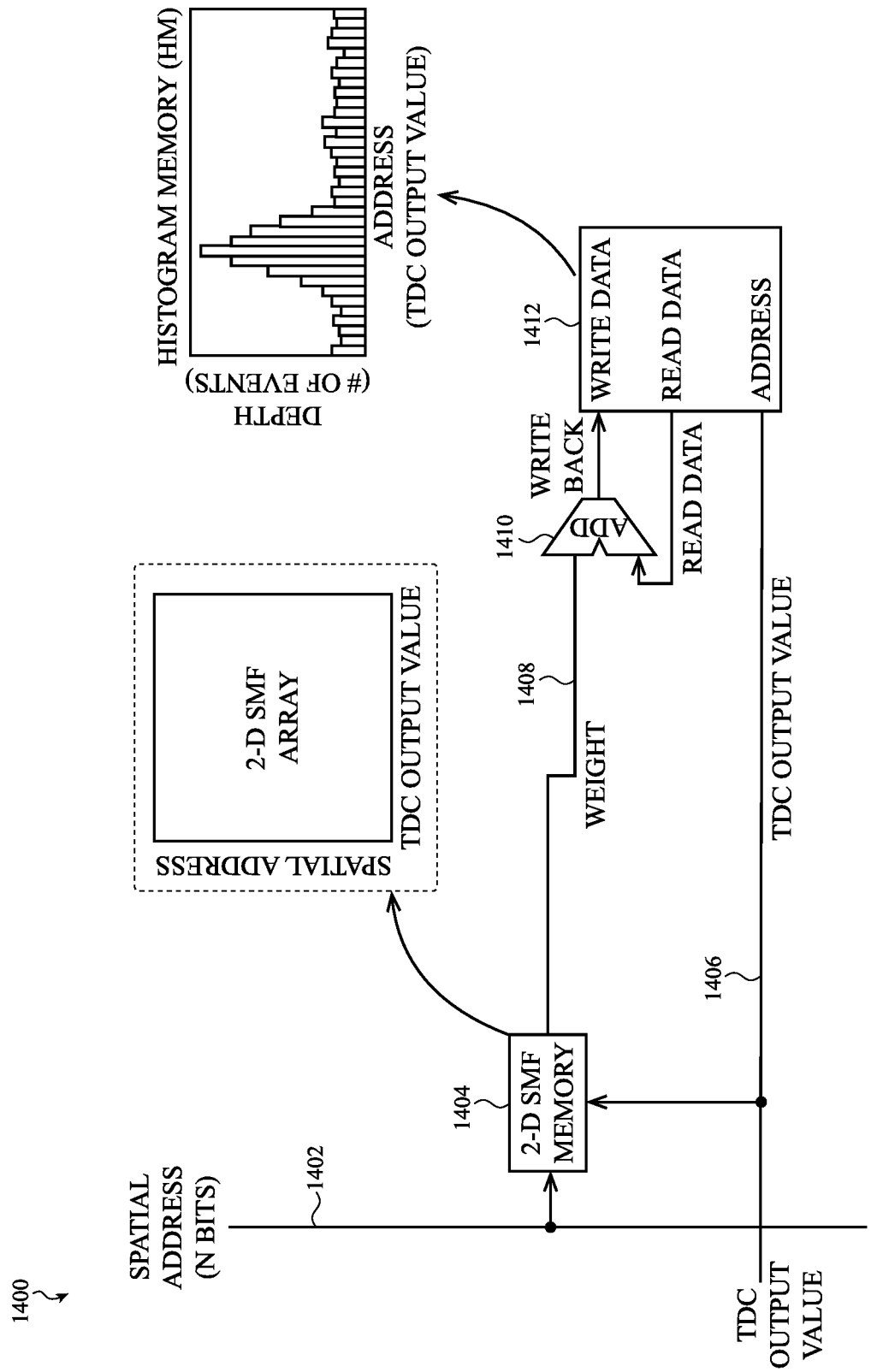
FIG. 14 shows a block diagram of an example spatial match filter circuit that is suitable for use in the spatial match circuitry shown in FIG. 13.

FIG. 14 shows a block diagram of an example spatial match filter circuit that is suitable for use in the spatial match circuitry 1310 shown in FIG. 13. The spatial match filter circuit 1400 includes a spatial match filter (SMF) memory 1404 that receives a spatial address from line 1402 and a TDC output value from line 1406. The SMF memory 1404 stores the weights for the TDC output values. The SMF memory represents one or more SMF memories. In one non-limiting example, an SMF memory can be implemented as a LUT as described in relation to FIG. 9. Additionally or alternatively, another SMF memory can store the weights that are used to substantially match the intensity profile of the returned light pulses to the intensity profile of the corresponding emitted light pulses, such as described in relation to FIGS. 11 and 12.

The SMF memory 1404 is illustrated in more detail in the expanded block. The TDC output value received from line 1406 and a spatial address received from line 1402 are used to access or read out a particular weight in the SMF memory 1404. The spatial address may be used to indicate the current PRI for the reflected light beam striking the pixel array. The line 1402 is distributed to all of the SMF circuits operably connected to the pixel array so the position of a SPAD output within a PRI can be determined. For example, in the embodiment shown in FIG. 15, the spatial address can identify in which subsection 1502, 1504, 1506, 1508, 1510, 1512, 1514, 1516 the PRI is occurring.

A weight that is read out of the SMF memory 1404 is received by the add circuit 1410 on line 1408. A histogram is stored in the histogram memory 1412. The add circuit 1410 determines the value (e.g., weighted TDC output value) that is used to increment the count in a bin of the histogram that is associated with the TDC output value on line 1406. In one embodiment, the increment value is the weight multiplied by one. The current count in the bin is read out of the histogram memory 1412 and the current count is incremented by the value. The incremented count is then written back to the histogram memory 1412. An example histogram that is stored in the histogram memory 1412 is visually displayed in FIG. 14.

Figure 15:
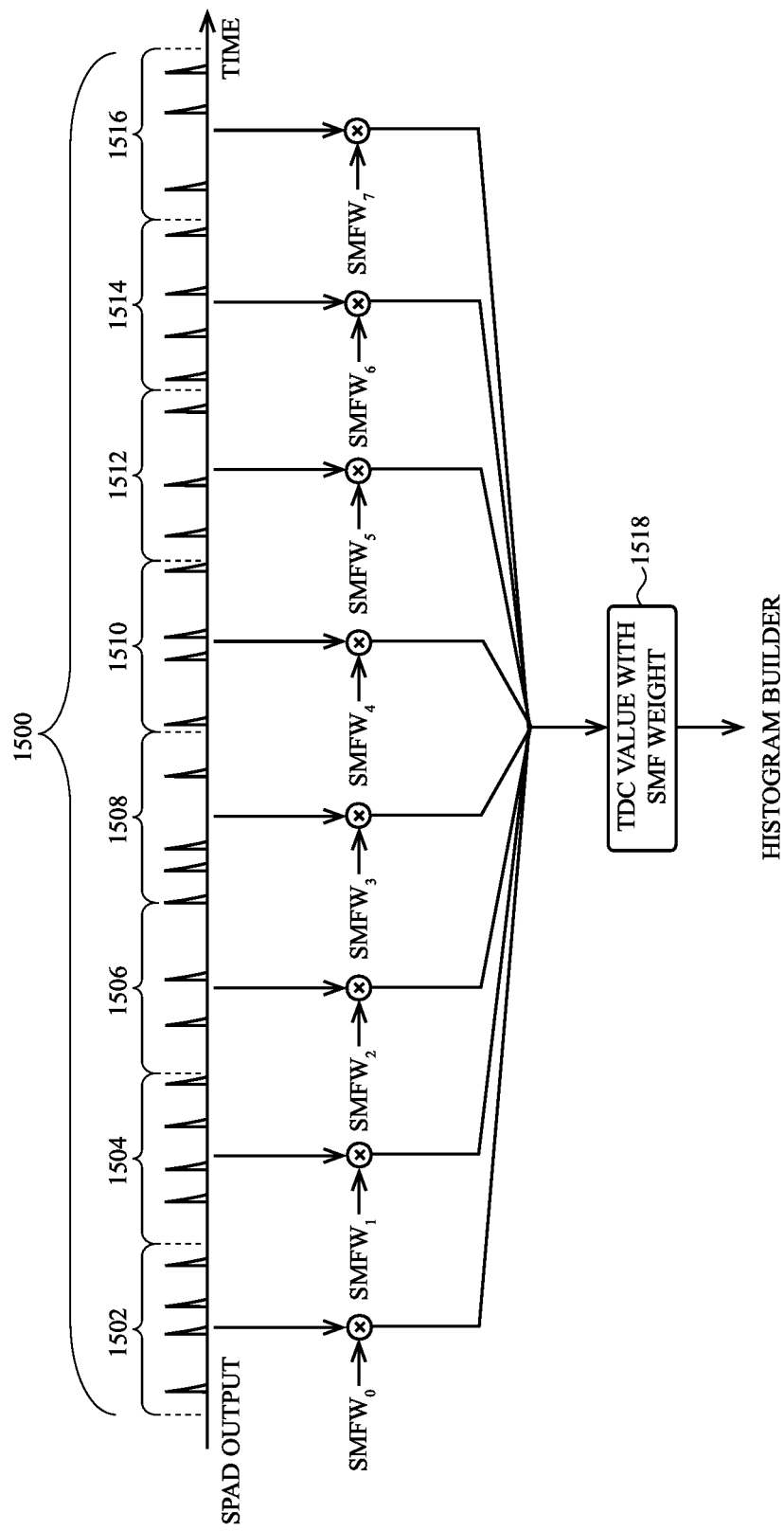
FIG. 15 shows a spatial matched filter.

FIG. 15 shows an example of a circuit that implements a spatial matched filter for applying weights to the TDC output values. The circuit can implement a faster application of weights to TDC output values during a section of PRIs by reducing the number of calls to a table of weights, such as a look-up table containing weights as in FIG. 9. When the distance to an object in the FOV has been estimated or is approximately known, the TDC histogram bin number can also be well estimated, and only the weights in the column of that TDC histogram bin number need be used as the weights applied to output signals during the PRIs of the section. The weight values can be moved temporarily into fast multiplier circuit elements.

In FIG. 15, the section 1500 comprises one section of the total sequence of PRIs for which the reflected light pulses are expected to fall at a particular pixel. In the example of FIG. 5D, in which the total sequence of PRIs for the particular pixel has length 6000, the length of section 1500 may be one third that length, or 2000. In the example shown in FIG. 15, the section 1500 of is further subdivided into N subsections, with N=8: 1502, 1504, 1506, 1508, 1510, 1512, 1514, 1516. The number N of subsections can correspond to the number of multiplier circuit elements, or taps, available to apply the weights. In the example shown in FIG. 15, the multiplier circuit elements are the eight different Spatial Matched Filter (SMF) weight multipliers—$SMFW_0$, $SMFW_1$, $SMFW_2$, $SMFW_3$, $SMFW_4$, $SMFW_5$, $SMFW_6$, $SMFW_7$. These SMF weight multipliers apply a respective weight to the output signals detected during its respective subsection 1502, 1504, 1506, 1508, 1510, 1512, 1514, 1516. The weighted results are then transferred with the TDC value(s) through node 1518 to a histogram builder.

As the section 1500 in this example spans 2000 PRIs, the subsections each span 250 respective PRIs from section 1500. The weights applied by the SMF weight multipliers $SMFW_0, \ldots, SMFW_7$ are taken from the column of weights for the determined TDC histogram bin number. The eight weights can provide a simplified step-wise approximation to an ideal intensity profile or function for the weights, as will be explained further with respect to FIG. 16. In order to get a good step-wise approximation with a limited number of SMF weight multipliers, the total sequence of PRIs at a pixel may need to be grouped into sections, such as section 1500. In the example of FIG. 15, each section would extend for 2000 PRIs. At the start of each section, weights for the eight subsections would be loaded from a table, such as from the LUT of FIG. 9, into the SMF weight multipliers. In this way only three calls to the LUT would be needed.

Although FIG. 15 depicts eight subsections and eight SMF weight multipliers, those skilled in the art will appreciate that other embodiments may use other numbers of sections and subsections and corresponding weights.

Figure 16:
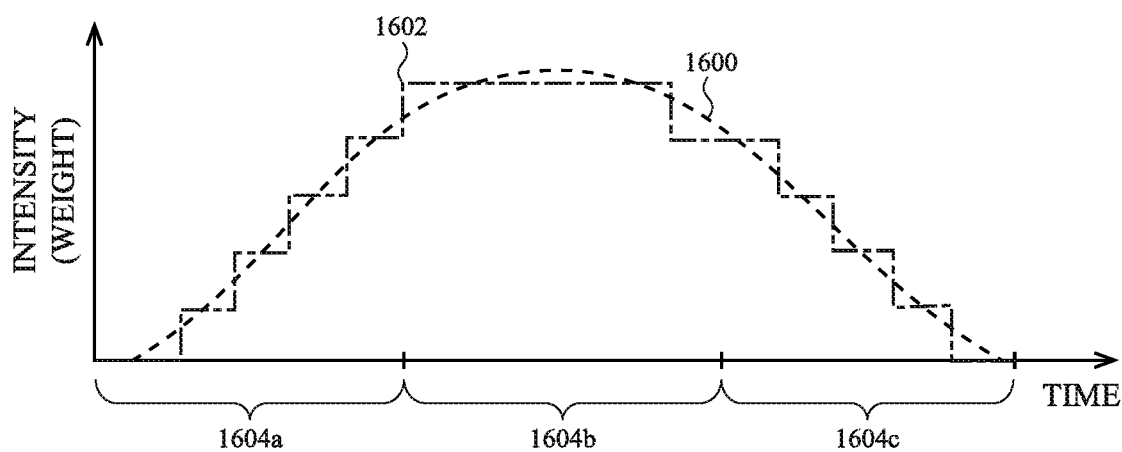
FIG. 16 shows a plot of ideal and approximate spatial matched filter weights for use with a spatial matched filter.

FIG. 16 shows a plot of an ideal intensity (magnitude) profile 1600 for weights of a spatial matched filter, and the realistic discrete-valued intensity profile 1602 of weights that could be generated for use with an actual spatial matched filter. The ideal intensity profile 1600 is depicted as a smooth a bell-curve shape, and the realistic intensity profile is a discrete-valued approximation to the ideal profile. In the example shown, both intensity profiles 1600 and 1602 give the weights to be applied to output signals for objects located far in the FOV.

In FIG. 16 the total sequence of PRIs is divided into three sections 1604a, 1604b, and 1604c, as discussed in the example of FIG. 15. Within each of sections 1604a-c, a respective set of weights may be used with the SMF weight multipliers. By using the same number of weights, such as eight as in the example of FIG. 15, it is possible for discrete-valued intensity profile 1602 to have a finer and so more accurate approximation to the ideal intensity (magnitude) profile 1600.

Figure 17:
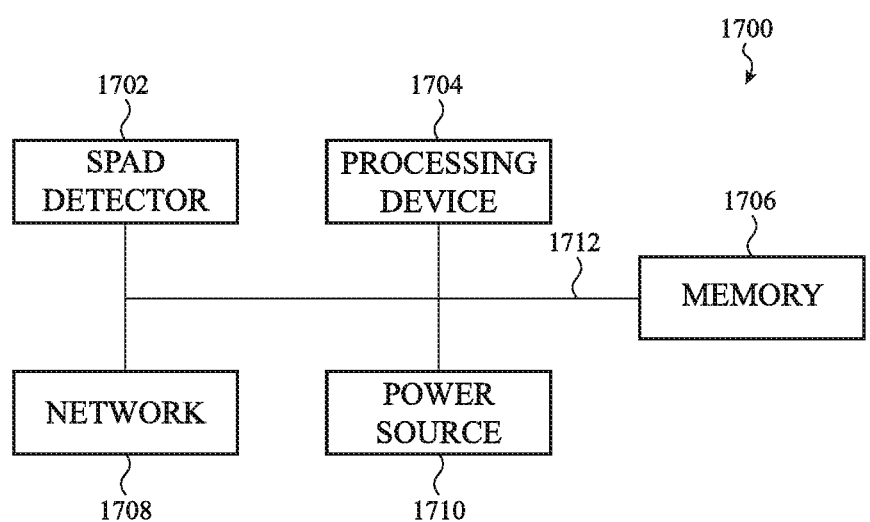
FIG. 17 shows a block diagram of an electronic device that can include one or more SPAD detectors.

FIG. 17 shows a block diagram of an electronic device 1700 that can include one or more SPAD detectors. The electronic device 1700 includes one or more SPAD detectors 1702, one or more processing devices 1704, memory 1706, one or more network interfaces 1708, and a power source 1710, each of which will be discussed in turn below.

The one or more processing devices 1704 can control some or all of the operations of the electronic device 1700. The processing device(s) 1704 can communicate, either directly or indirectly, with substantially all of the components of the electronic device 1700. For example, one or more system buses 1712 or other communication mechanisms can provide communication between the SPAD detector(s) 1702, the processing device(s) 1704, the memory 1706, the network interface 1708, and/or the power source 1710. In some embodiments, the processing device(s) 1704 can be configured to receive output signals from the SPAD detectors 1702 and process the output signals to determine one or more characteristics associated with the reflected light, the object (e.g., object 106 in FIG. 1), and/or the scene.

The processing device(s) 1704 can be implemented as any electronic device capable of processing, receiving, or transmitting data or instructions. For example, the one or more processing devices 1904 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The memory 1706 can store electronic data that can be used by the electronic device 1700. For example, the memory 1706 can store electrical data or content such as, for example, audio files, document files, timing and control signals, and so on. The memory 1706 can be configured as any type of memory. By way of example only, memory 1706 can be implemented as random access memory, read-only memory, Flash memory, removable memory, or other types of storage elements, in any combination.

The network interface 1708 can receive data from a user or one or more other electronic devices. Additionally, the network interface 1708 can facilitate transmission of data to a user or to other electronic devices. The network interface 1708 can receive data from a network or send and transmit electronic signals via a wireless or wired connection. For example, the photon counts that are determined by the processing device(s) 1704 can be transmitted to another electronic device using the network interface 1708.

Examples of wireless and wired connections include, but are not limited to, cellular, Wi-Fi, Bluetooth, and Ethernet. In one or more embodiments, the network interface 1708 supports multiple network or communication mechanisms. For example, the network interface 1708 can pair with another device over a Bluetooth network to transfer signals to the other device while simultaneously receiving signals from a Wi-Fi or other wired or wireless connection.

The one or more power sources 1710 can be implemented with any device capable of providing energy to the electronic device 1700. For example, the power source 1710 can be a battery. Additionally or alternatively, the power source 1710 can be a wall outlet that the electronic device 1700 connects to with a power cord. Additionally or alternatively, the power source 1710 can be another electronic device that the electronic device 1700 connects to via a wireless or wired connection (e.g., a connection cable), such as a Universal Serial Bus (USB) cable.

In some embodiments, the SPAD detector 1702 is configured as a back-illuminated SPAD detector. In such embodiments, the pixel array is positioned adjacent to a light receiving surface of the SPAD detector and the circuitry (e.g., gating transistor, quenching transistor, etc.) connected to the SPADs in the pixel array are positioned below the pixel array. Other embodiments can configure the SPAD detector 1702 differently.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of estimating a distance of an object from a sensor; the method comprising:
    emitting an emitted light pulse during an initial segment of each pulse repetition interval (PRI) of a sequence of pulse repetition intervals (PRIs);
    receiving, at a light sensing pixel of the sensor, during each of a plurality of PRIs of the sequence of PRIs, a received light pulse;
    determining a time-of-flight of each of the received light pulses;
    for each time-of-flight, determining a weight based on the time-of-flight and a position within the sequence of PRIs of the PRI during which the received light pulse corresponding to the time-of-flight was received;
    forming a weighted count of the times-of-flight using the determined weights; and
    estimating the distance to the object based on the weighted count of the times-of-flight.

2. The method of claim 1, further comprising:
    receiving a determination that the object is located at a far distance in a field of view; and
    determining relative signal to noise ratios for the received light pulses;
    wherein the weights used to form the weighted count of the times-of-flight are larger for received light pulses with higher signal to noise ratios than for received light pulses with lower signal to noise ratios.

3. The method of claim 2, wherein the weights are larger for times-of-flight of received light pulses received during a middle section of the sequence of PRIs than for times-of-flight of received light pulses received during a peripheral section of the sequence of PRIs.

4. The method of claim 1, wherein the weights are used with a spatial matched filter to form the weighted count of the times-of-flight.

5. The method of claim 1, further comprising:
    receiving a determination that the object is located at a near distance in a field of view;
    wherein the determined weights used to form the weighted count of the times-of-flight are larger for received light pulses with reduced intensity than for received light pulses without reduced intensity.

6. The method of claim 5, wherein the weights are larger for times-of-flight of received light pulses received during a peripheral section of the sequence of PRIs.

7. The method of claim 1, wherein the weights are determined using the time-of-flight and the position within the sequence of the PRIs with a look-up table (LUT) having a first axis representing the position within the sequence of PRIs, and a second axis corresponding to discrete subintervals of time within the PRIs.

8. The method of claim 7, wherein:
    the weights in the LUT corresponding to a first subset of the discrete subintervals of time are larger for positions from peripheral sections within the sequence of PRIs than for positions from a middle section within the sequence of PRIs; and
    the weights in the LUT corresponding to a second subset of the discrete subintervals of time are larger for middle positions within the sequence of PRIs than for peripheral positions within the sequence of PRIs.

9. The method of claim 1, wherein the light sensing pixel of the sensor comprises a single-photon avalanche diode.

10. A method of operating a light sensor; the method comprising:
emitting a sequence of outgoing light pulses over a sequence of time intervals, one outgoing light pulse being emitted during an initial segment of each time interval of the sequence of time intervals;
receiving a first set of received light pulses during an initial section of the sequence of time intervals;
detecting whether the object is present at a near distance within a field of view of the light sensor based on an aggregation of times-of-flight of each received light pulse of the first set of received light pulses;
in the case that the object is not detected in the near distance:
receiving a second set of received light pulses during time intervals that follow the initial section of the sequence of time intervals;
determining relative signal to noise ratios for the received light pulses in the second set of received light pulses;
forming a first weighted count of times-of-flight of the second set of received light pulses using a first set of weights; and
determining a distance to the object based on the first weighted count; and
in the case that the object is detected in the near distance:
receiving a third set of received light pulses during the time intervals that follow the initial section of the sequence of time intervals;
forming a second weighted count of times-of-flight of the third set of received light pulses using a second set of weights; and
determining the distance to the object based on the second weighted count;
wherein:
weights of the first set of weights are larger for a first subset of the second set of received light pulses having higher signal to noise ratios than a second subset of the second set of received light pulses; and
weights of the second set of weights are larger for received light pulses with reduced intensity.

11. The method of claim 10, wherein the weights of the first set of weights are larger for times-of-flight of received light pulses that were received in a middle section of the sequence of time intervals than for times-of-flight of received light pulses that were received in peripheral sections of the sequence of time intervals.

12. The method of claim 10, wherein the weights of the second set of weights are larger for times-of-flight of received light pulses that were received in a peripheral section of the sequence of time intervals than for times-of-flight of received light pulses that were received in a middle section of the sequence of time intervals.

13. The method of claim 10, wherein the times-of-flight of the first, second, and third sets of received light pulses are determined from discrete subintervals of time of the time interval during which received light pulses were received.

14. The method of claim 10, wherein the first weighted count is formed using the first set of weights with a spatial matched filter.

15. The method of claim 10, wherein:
the light sensor includes a photodetector array comprising single-photon avalanche diode (SPAD) pixels; and
the first, second, and third sets of received light pulses are received at one of the SPAD pixels.

16. An electronic device comprising:
a scanning light sensor system comprising:
an emitter;
a detector that includes an array of light sensing pixels; and
a processing device communicatively linked with the emitter and the detector; wherein:
the processing device is configured to cause the emitter to emit an emitted light pulse during an initial segment of each pulse repetition interval (PRI) of a sequence of pulse repetition intervals (PRIs);
the detector is configured to:
receive, during each of a plurality of PRIs of the sequence of PRIs, a received light pulse; and
determine a respective time-of-flight for each of the received light pulses, each of the respective times-of-flight determined from a discrete subinterval of time of the PRI during which the received light pulse was received; and
the processing device is further configured to:
determine a weight for each time-of-flight, each weight determined using at least a position within the sequence of PRIs of the PRI during which the received light pulse was received;
form a weighted count of the times-of-flight using the weights; and
estimate a distance to an object based on the weighted count of the times-of-flight.

17. The electronic device of claim 16, wherein:
the weights are determined using the time-of-flight and the position within the sequence of the PRIs with a look-up table (LUT) having a first axis representing the position within the sequence of PRIs, and a second axis corresponding to the discrete subintervals of time.

18. The electronic device of claim 17, wherein:
the weights in the LUT corresponding to a first subset of the discrete subintervals of time are larger for positions from peripheral sections within the sequence of PRIs than for positions from a middle section within the sequence of PRIs; and
the weights in the LUT corresponding to a second subset of the discrete subintervals of time are larger for middle positions within the sequence of PRIs than for peripheral positions within the sequence of PRIs.

19. The electronic device of claim 16, wherein the weights are used with a spatial matched filter to form the weighted count of the times-of-flight.

20. The electronic device of claim 16, wherein at least of one of the light sensing pixels includes a single-photon avalanche diode.

21. A method of estimating a distance to an object, comprising:
for each pulse repetition interval (PRI) in a set of PRIs, emitting a light pulse at a first time within the PRI;
for at least one of the PRIs, detecting light at a second time within the PRI, the second time subsequent to the first time;
determining from the first time and the second time, and for each PRI in the at least one of the PRIs, an estimated time-of-flight (TOF) for at least one photon in the detected light received within the PRI;
determining a weighted increment value for each estimated TOF; and
estimating the distance to the object using the weighted increment value for each estimated TOF.

22. The method of claim 21, further comprising:
updating a TOF histogram using the weighted increment values; wherein:
the distance to the object is estimated using the TOF histogram.

\* \* \* \* \*